US012139935B2

(12) United States Patent
Wong

(10) Patent No.: US 12,139,935 B2
(45) Date of Patent: Nov. 12, 2024

(54) LOCK WITH A LOCKABLE PUSH-THROUGH LATCH

(71) Applicant: Sargent Manufacturing Company, New Haven, CT (US)

(72) Inventor: Wai P. Wong, Orange, CT (US)

(73) Assignee: Sargent Manufacturing Company, New Haven, CT (US)

( * ) Notice: Subject to any disclaimer, the term of this patent is extended or adjusted under 35 U.S.C. 154(b) by 449 days.

(21) Appl. No.: 16/543,915

(22) Filed: Aug. 19, 2019

(65) Prior Publication Data

US 2020/0056403 A1 Feb. 20, 2020

Related U.S. Application Data

(60) Provisional application No. 62/719,192, filed on Aug. 17, 2018.

(51) Int. Cl.
*E05B 47/00* (2006.01)
*E05B 15/02* (2006.01)
(Continued)

(52) U.S. Cl.
CPC ........ *E05B 47/0001* (2013.01); *E05B 15/022* (2013.01); *E05B 47/0047* (2013.01);
(Continued)

(58) Field of Classification Search
CPC ...... E05B 15/022; E05B 63/12; E05B 63/121; E05B 63/126; E05B 17/2026; E05B 17/2057; E05B 17/2088; E05B 55/12; E05B 63/24; E05B 63/244; E05B 63/248; E05B 63/22; E05B 47/0001; E05B 47/0016;
(Continued)

(56) References Cited

U.S. PATENT DOCUMENTS 1,758,203 A * 5/1930 Segal .................... E05B 63/121 70/370
2,113,747 A * 4/1938 Roedding ............. E05B 63/244 292/227
(Continued)

FOREIGN PATENT DOCUMENTS

EP 2 975 202 A1 1/2016
GB 1 529 228 A 10/1978
(Continued)

*Primary Examiner* — Kristina R Fulton
*Assistant Examiner* — James Edward Ignaczewski
(74) *Attorney, Agent, or Firm* — Wolf, Greenfield & Sacks, P.C.

(57) ABSTRACT

A lock having a latch assembly with a bolt head freely movable between an extended position and a retracted position. The latch assembly also includes lock pin that is movable between a locked position and an unlocked position, which may be moveable by a motor and/or biasing mechanism. The lock also has a strike assembly including a strike housing for receiving the bolt head. The strike housing includes a keeper biased to a latched position relative to the bolt head. When the lock pin is in the locked position, the lock pin engages the keeper to hold the keeper in the latched position, and thus the bolt head in the extended position in the strike housing. The lock also includes an access control system for controlling the motor of the lock.

26 Claims, 19 Drawing Sheets

(51) Int. Cl.
*E05B 59/00* (2006.01)
*E05B 63/24* (2006.01)
*E05B 55/00* (2006.01)

(52) U.S. Cl.
CPC ............ *E05B 59/00* (2013.01); *E05B 63/244* (2013.01); *E05B 55/005* (2013.01)

(58) Field of Classification Search
CPC ............. E05B 47/0603; E05B 15/0245; E05B 2047/0016; E05B 47/0047; E05B 47/06; E05B 47/0046; E05B 55/0005; E05B 17/20; E05B 17/203; E05B 17/2038; E05B 17/2049; E05B 17/2069; E05B 17/2007; E05B 17/0025; E05B 63/0004; E05B 63/128; E05B 63/242; E05B 65/0017; E05B 2015/0265; E05B 47/063; E05C 19/02; Y10S 292/04; Y10T 292/102; Y10T 292/68
USPC ......... 292/340, 341.15, 341.16, 341.17, 202, 292/207; 70/280
See application file for complete search history.

(56) References Cited

U.S. PATENT DOCUMENTS

| | | | | | |
|---|---|---|---|---|---|
| 2,156,004 | A | | 4/1939 | Vanderlinde | |
| 2,346,656 | A | | 4/1944 | Berghoff | |
| 2,575,465 | A | * | 11/1951 | Patton | E05B 65/0811 292/341.17 |
| 3,359,027 | A | | 12/1967 | Schlage et al. | |
| 3,371,947 | A | | 3/1968 | Gridley | |
| 4,087,121 | A | * | 5/1978 | Davis | E05B 63/128 292/341.17 |
| 4,181,338 | A | * | 1/1980 | Sterling | E05B 15/022 292/341.17 |
| 4,573,333 | A | | 3/1986 | Choi | |
| 4,671,549 | A | | 6/1987 | Marotto et al. | |
| 5,113,676 | A | | 5/1992 | Panossian et al. | |
| 5,474,342 | A | * | 12/1995 | Smith | E05B 47/0046 292/341.16 |
| 5,794,991 | A | * | 8/1998 | Smallegan | E05B 63/126 292/150 |
| 6,536,812 | B1 | * | 3/2003 | Winardi | E05B 63/06 292/DIG. 60 |
| 7,410,196 | B2 | * | 8/2008 | Stein | E05B 47/0047 292/341.15 |
| 7,980,603 | B2 | | 7/2011 | Peabody et al. | |
| 9,945,153 | B2 | * | 4/2018 | Scheffler | E05B 47/0047 |
| 11,598,131 | B2 | | 3/2023 | Romero | |
| 2007/0007773 | A1 | * | 1/2007 | Berkseth | E05B 53/00 292/169 |
| 2008/0127686 | A1 | * | 6/2008 | Hwang | E05B 47/0012 340/5.6 |
| 2010/0109349 | A1 | * | 5/2010 | Peabody | E05B 55/12 292/194 |
| 2015/0075233 | A1 | * | 3/2015 | Pluta | E05B 47/0046 70/129 |
| 2015/0330100 | A1 | | 11/2015 | Helisten | |
| 2017/0268256 | A1 | * | 9/2017 | Geringer | E05B 47/026 |
| 2019/0376317 | A1 | * | 12/2019 | Hsu | E05B 63/24 |
| 2019/0383060 | A1 | * | 12/2019 | Lien | E05B 47/0692 |
| 2021/0293053 | A1 | | 9/2021 | Bedford et al. | |

FOREIGN PATENT DOCUMENTS

| | | | |
|---|---|---|---|
| KR | 2017-0111228 | A | 10/2017 |
| KR | 2017-0119114 | A | 10/2017 |
| KR | 10-2282164 | B1 | 7/2021 |

* cited by examiner

LOCK WITH A LOCKABLE PUSH-THROUGH LATCH

CROSS REFERENCE AND PRIORITY CLAIM UNDER 35 U.S.C. 119

The present Application for a Patent claims priority to U.S. Provisional Patent Application Ser. No. 62/719,192 entitled "A Lock with a Lockable Push-Through Latch" filed on Aug. 17th, 2018 and assigned to the assignees hereof and hereby expressly incorporated by reference herein.

FIELD

This invention relates generally to locks, and more particularly to a lockable push-through latch.

BACKGROUND

A push-through latch is designed to fit into a mortised recess formed in the edge of a door. The push-through latch generally includes a housing, or case, which encloses the latch components. One component of a push-through latch is a latch bolt that is movable in the case between an extended position and a retracted position. In the extended position a beveled bolt head projects outside of the case and beyond the edge of the door and into an opening in the door frame to latch the door in a closed position. In the retracted position the beveled bolt head is retracted inside of the case to permit opening and closing of the door. The latch bolt may be unlatched, and the door opened by applying a pushing or pulling force directly to the door such that the force applied to the door forces the latch bolt to retract.

SUMMARY

Embodiments of the disclosure include a lock comprising a latch assembly and a strike assembly. The latch assembly comprises a bolt head movable between an extended position and a retracted position, and a lock pin movable between a locked position and an unlocked position. The strike assembly comprises a strike housing for receiving the bolt head, and a keeper movable between a latched position and an unlatched position relative to the bolt head. When the lock pin is in the locked position, the lock pin engages the keeper to hold the keeper in the latched position.

In further accord with embodiments of the disclosure, the latch assembly further comprises a keeper biasing mechanism that biases the keeper to the latched position.

In other embodiments of the disclosure, the latch assembly further comprises a bolt head biasing mechanism that biases the bolt head to the extended position.

In still other embodiment of the disclosure, the latch assembly further comprises a mount operatively coupled to the bolt head, and a post that engages the mount to set the retracted position.

In yet other embodiments of the disclosure, when the bolt head moves it exerts a force against the keeper to rotate the keeper from the latched position towards the unlatched position.

In other embodiments of the disclosure, the latch assembly further comprises a motor operatively coupled to the lock pin. The motor moves the lock pin between the locked position and/or the unlocked position.

In further accord with embodiments of the disclosure, the lock further comprises an access control device operatively coupled to the motor, which is actuated in response to receiving a signal from the access control device.

In other embodiments of the disclosure, the motor is actuated in response to receiving the signal from a user interface in the access control device and/or a user access device. The access control device comprises the user interface, and the user access device is separate from the lock.

In still other embodiments of the disclosure, the motor is actuated in response to receiving a signal from a sensor operatively coupled to the motor.

In yet other embodiments of the disclosure, the strike assembly further comprises a stop operatively coupled to the strike housing, and the stop engages the keeper to set the latched position.

In other embodiments of the disclosure, the strike assembly further comprises a strike plate operatively coupled to the strike housing. When the keeper is in the unlatched position a keeper locking surface and a strike plate surface of a strike plate portion are planer, and the bolt head slides along the keeper locking surface and the strike plate surface.

Other embodiments of the disclosure include a latch assembly comprising a bolt head movable between an extended position and a retracted position, a lock pin movable between a locked position and an unlocked position independently of the bolt head, and a motor operatively coupled to the lock pin for moving the lock pin between the locked position and/or the unlocked position.

In further accord with embodiments of the disclosure, the motor is configured for operative coupling with an access control device, wherein the motor is actuated in response to receiving a signal from the access control device.

Other embodiments of the disclosure include a strike assembly comprises a strike housing is configured to receive a bolt head of a lock, a keeper operatively coupled to the strike housing and movable relative to the strike housing between a latched position and an unlatched, and a keeper biasing mechanism that biases the keeper to the latched position.

In further accord with embodiments of the disclosure, the strike assembly further comprises a stop operatively coupled to the strike housing that engages the keeper to set the latched position.

Other embodiments of the disclosure including a method of operating a lock that comprises a latch assembly comprising a bolt head and locking pin, and a strike assembly comprising a strike housing and a keeper. The latch assembly is mounted to a door and the strike assembly is mounted to a frame adjacent the door. The method comprises moving the bolt head to an extended position into the strike housing, moving the keeper into a latched position, and moving a lock pin from an unlocked position to a locked position, wherein in the locked position the lock pin engages the keeper to maintain the keeper to restrict movement of the bolt head.

In further accord with embodiments of the disclosure, the method further comprises moving the lock pin from the locked position to the unlocked position such that the lock pin is disengaged from the keeper, and moving the door to move the bolt head to exert a force on the keeper such that the keeper moves to an unlatched position.

In other embodiments of the disclosure the latch assembly further comprises a motor, and the method further comprises actuating the motor to move the lock pin to the unlocked position or the locked position.

In still other embodiments of the disclosure the lock further comprises an access control device operatively coupled to the motor, and the method further comprises actuating the motor in response to receiving a single from the access control device.

In yet other embodiments of the disclosure, the lock pin is moved from the unlocked position to the locked position in response to closing of the door.

BRIEF DESCRIPTION OF THE DRAWINGS

The following figures illustrate embodiments of the invention and are not necessarily drawn to scale, wherein.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when a component is referred to as being "on" or extending "onto" another component, it can be directly on or extend directly onto the other component or intervening components may also be present. In contrast, when a component is referred to as being "directly on" or extending "directly onto" another component, there are no intervening components present. It will also be understood that when a component is referred to as being "connected", "coupled", or "operatively coupled" to another component, it can be directly "connected", "coupled", or "operatively coupled" to the other component or intervening components may be present. In contrast, when a component is referred to as being "directly connected", "directly coupled", or "directly operatively coupled" to another component, there are no intervening components present. Moreover, "connected", "coupled", or "operatively coupled" may mean that components may be permanently or removeably "connected", "coupled", or "operatively coupled" to each other. Furthermore, "connected", "coupled", or "operatively coupled" may mean that components are integrally formed together or separately formed and "connected", "coupled", or "operatively coupled" together.

Relative terms such as "below", "above", "upper", "lower", "horizontal", "vertical", "top", "bottom", "left", "right", "back", "front", "side", "parallel", "perpendicular" may be used herein to describe a relationship of one component, layer or region to another component, layer or region as illustrated in the figures. It will be understood that these terms are intended to encompass different orientations of the device in addition to the orientation depicted in the figures.

Figure 1:
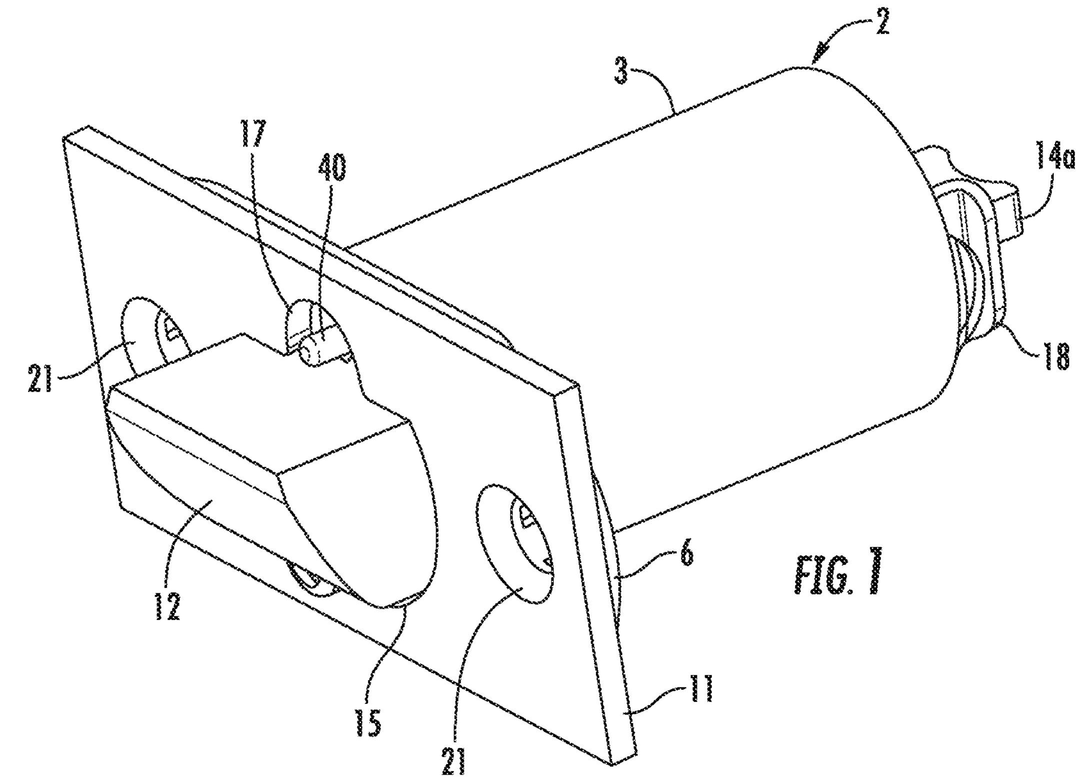
FIG. 1 is a perspective view of an embodiment of a lockable push-through latch assembly according to embodiments of the present invention.
Figure 2:
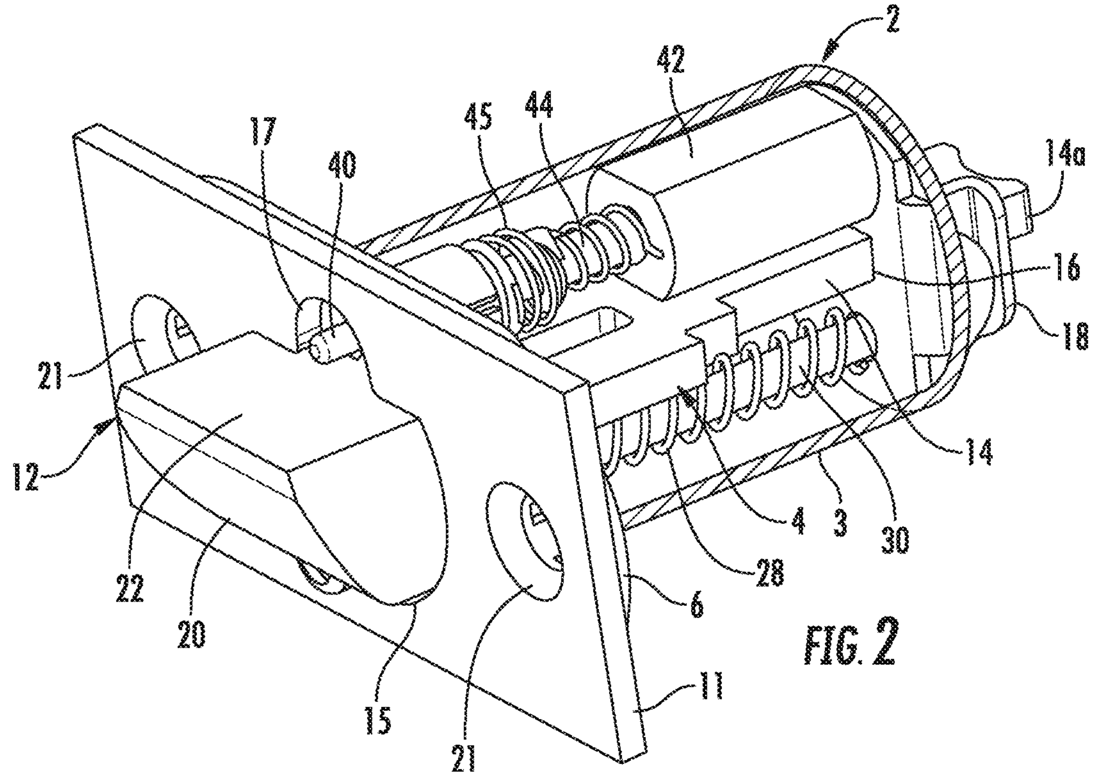
FIG. 2 is a perspective view of the lockable push-through latch assembly of FIG. 1 with the case cut-away to reveal the internal components of the latch assembly showing the lock pin in a first position.
Figure 3:
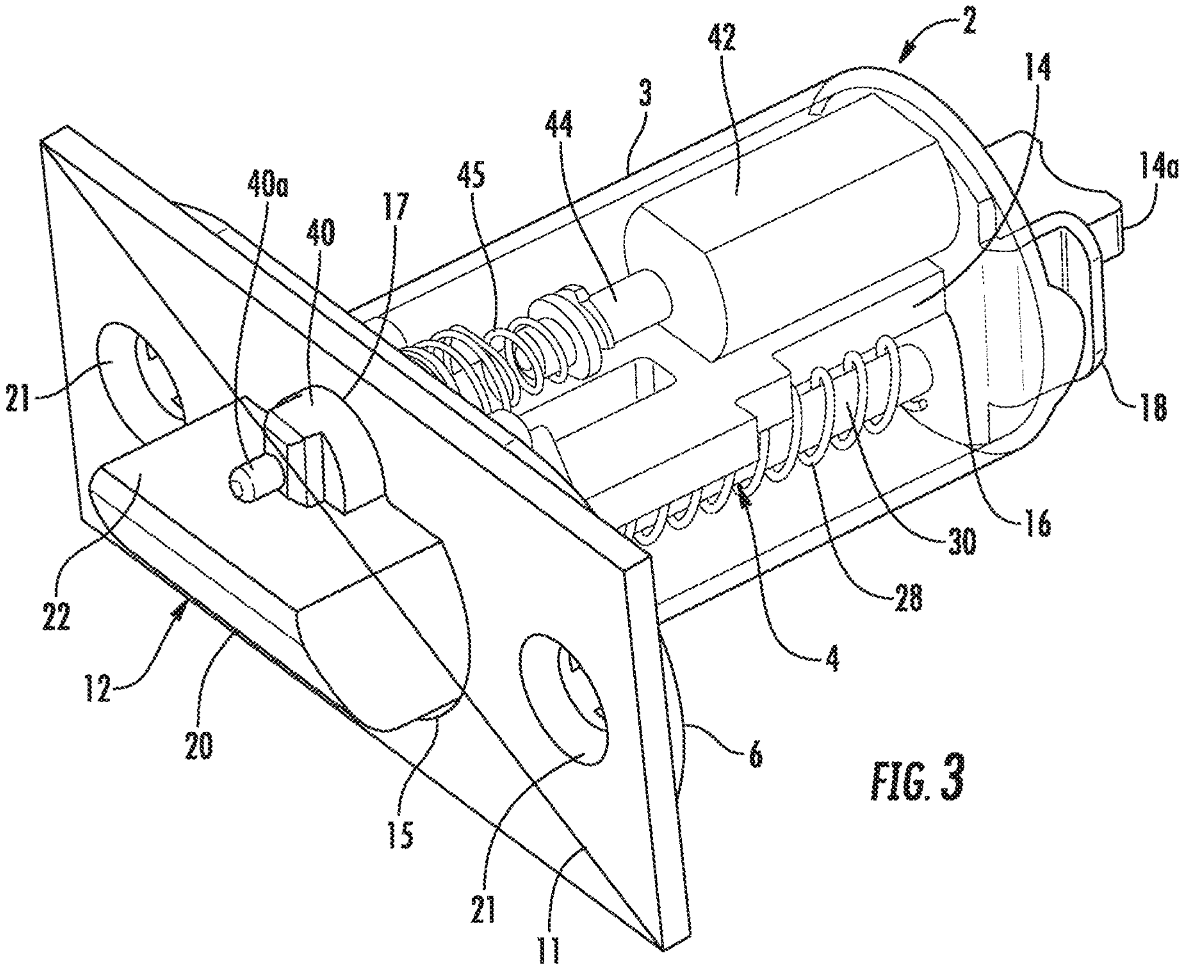
FIG. 3 is a perspective view of the lockable push-through latch assembly of FIG. 1 with the case cut-away to reveal the internal components of the latch assembly showing the lock pin in a second position.

Referring now to FIGS. 1 through 5, a lockable push-through latch 2 usable in a door lock 1 is shown. The push through latch 2 (e.g., otherwise described herein as latch assembly 2) comprises a case 3 (e.g., a cylindrical, oval, square, rectangular, any polygonal, any irregular, or other like shape) that houses the lock components and is adapted to be received in a mortise 5 in a free, or unhinged, edge of a door 7. The case 3 includes a front wall 6 that includes an opening 8 (e.g., bolt head opening) for receiving the bolt head 12 of the latch bolt 4. The front wall 6 includes another opening 10 (e.g., a lock pin opening) for receiving a lock pin 40. The openings 8 and 10 may form a single opening in the front wall 6 or may be separate openings (e.g., one or more front wall openings). A face plate 11 may be operatively coupled to the front wall 6 of the case 3 that includes the openings 15 and 17 (e.g., face plate openings for the bolt head 12 and/or the lock pin 40), which correspond to the openings 8 and 10 in the front wall 6. Like the openings 8 and 10 in the front wall 6, the openings 15 and 17 in the face plate 11 may form a single opening in the face plate 11 as shown, or may be separate openings (e.g., one or more face plate openings). In FIGS. 1 and 2, the latch bolt 4 is shown in the extended, latched position where the bolt head 12 is projecting from the opening 15 and the lock pin 40 is in the retracted, unlocked position. In FIG. 3, the latch bolt 4 is shown in the extended, latched position with the lock pin 40 shown in the extended, locked position projecting from opening 17. The front wall 6 of case 3 and the face plate 11 may include aligned apertures 23 and 21 respectively for receiving fasteners, such as screws or other types of fasteners, for mounting the latch 2 to a door 7 as shown in FIGS. 25-28. The door 7 is hinged in a door frame 9 at hinge H such that the door 7 can pivot on hinge H between open positions and a closed position where the door 7 is engaged with the frame 9.

Figure 5:
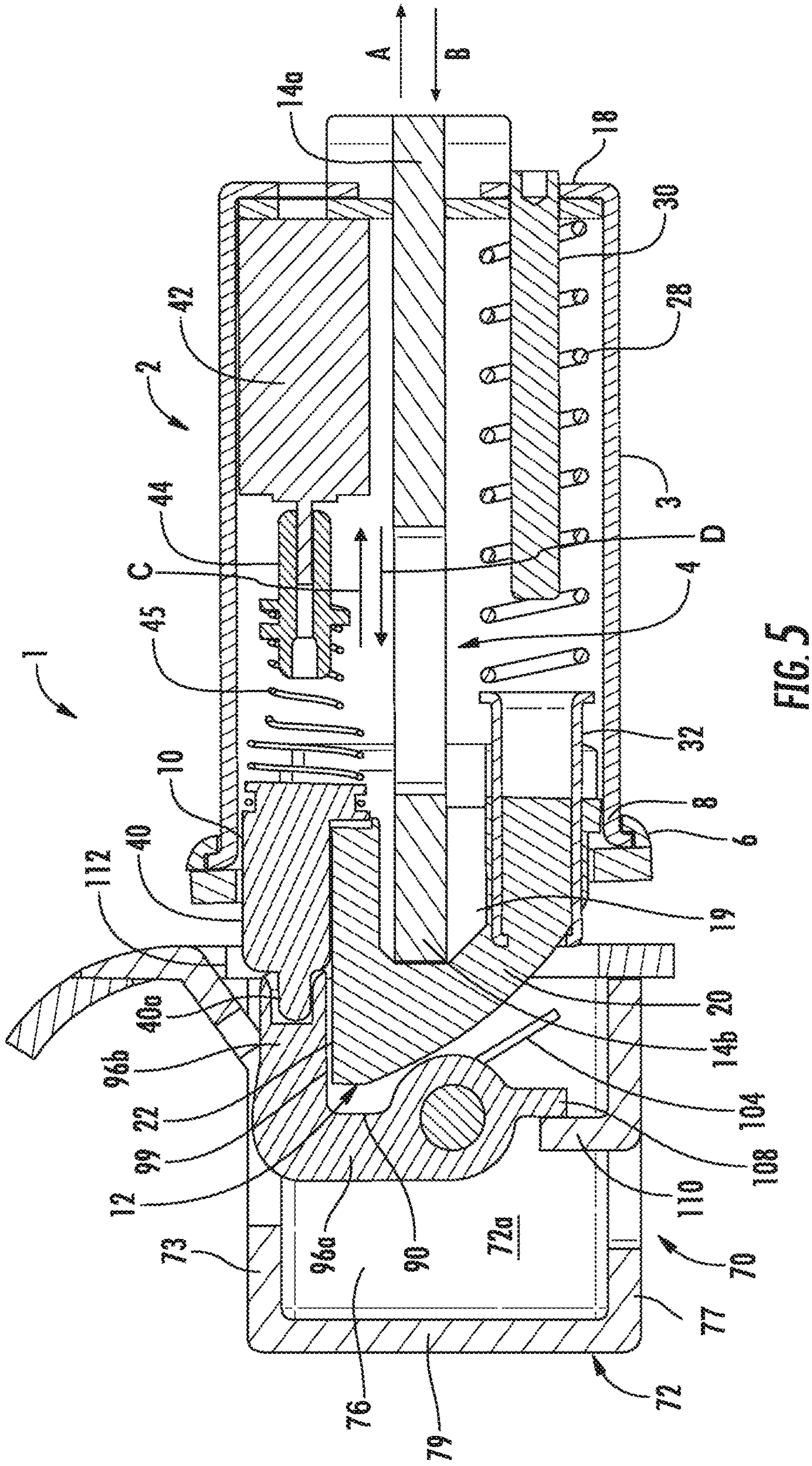
FIG. 5 is a section view of the lock including the lockable push-through latch assembly of FIG. 1 and strike assembly of FIG. 4 taken along a longitudinal center-line of the lock.
Figure 6:
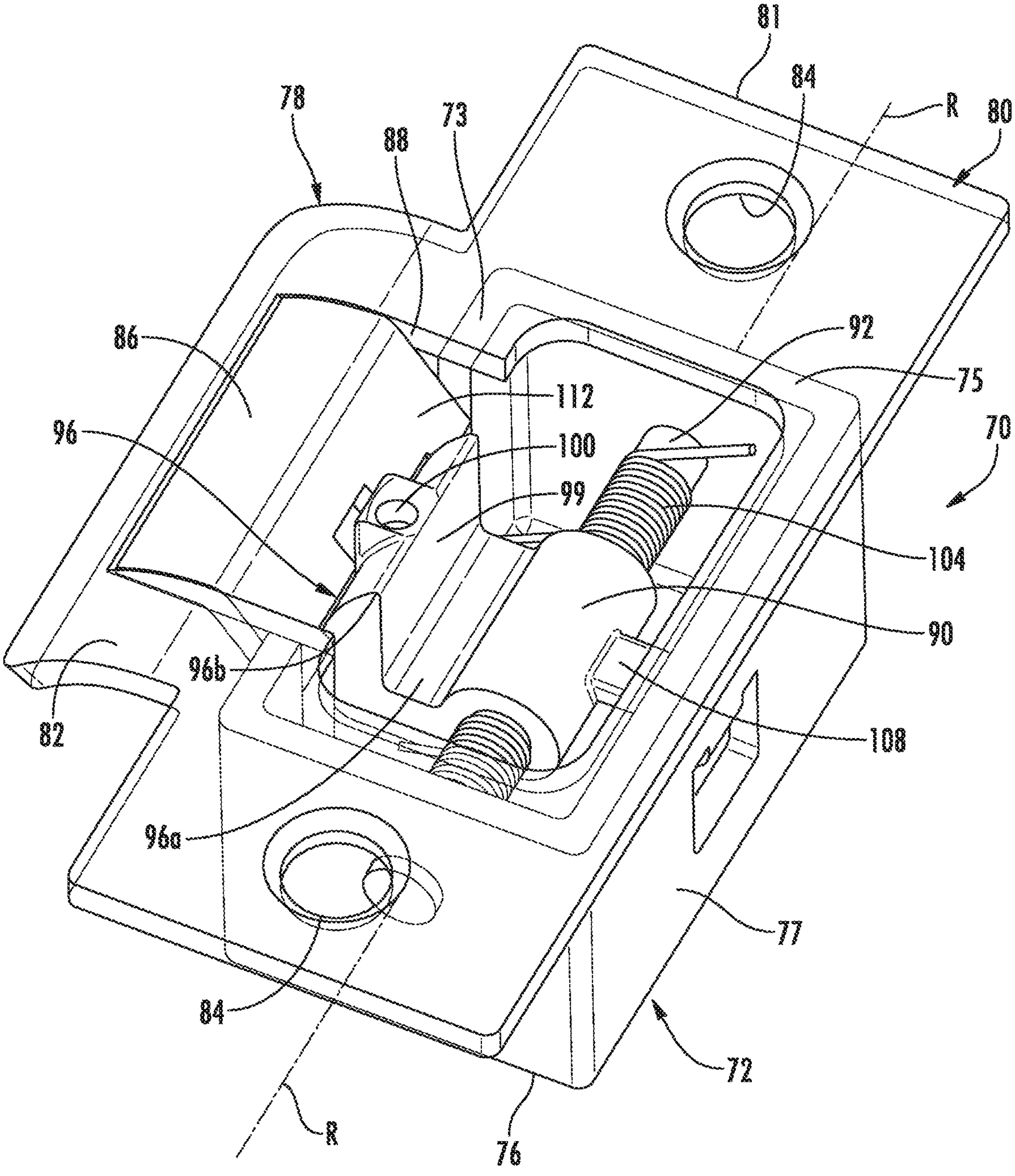
FIG. 6 is a perspective view of the strike assembly of FIG. 4 with the keeper in a locked position.
Figure 7:
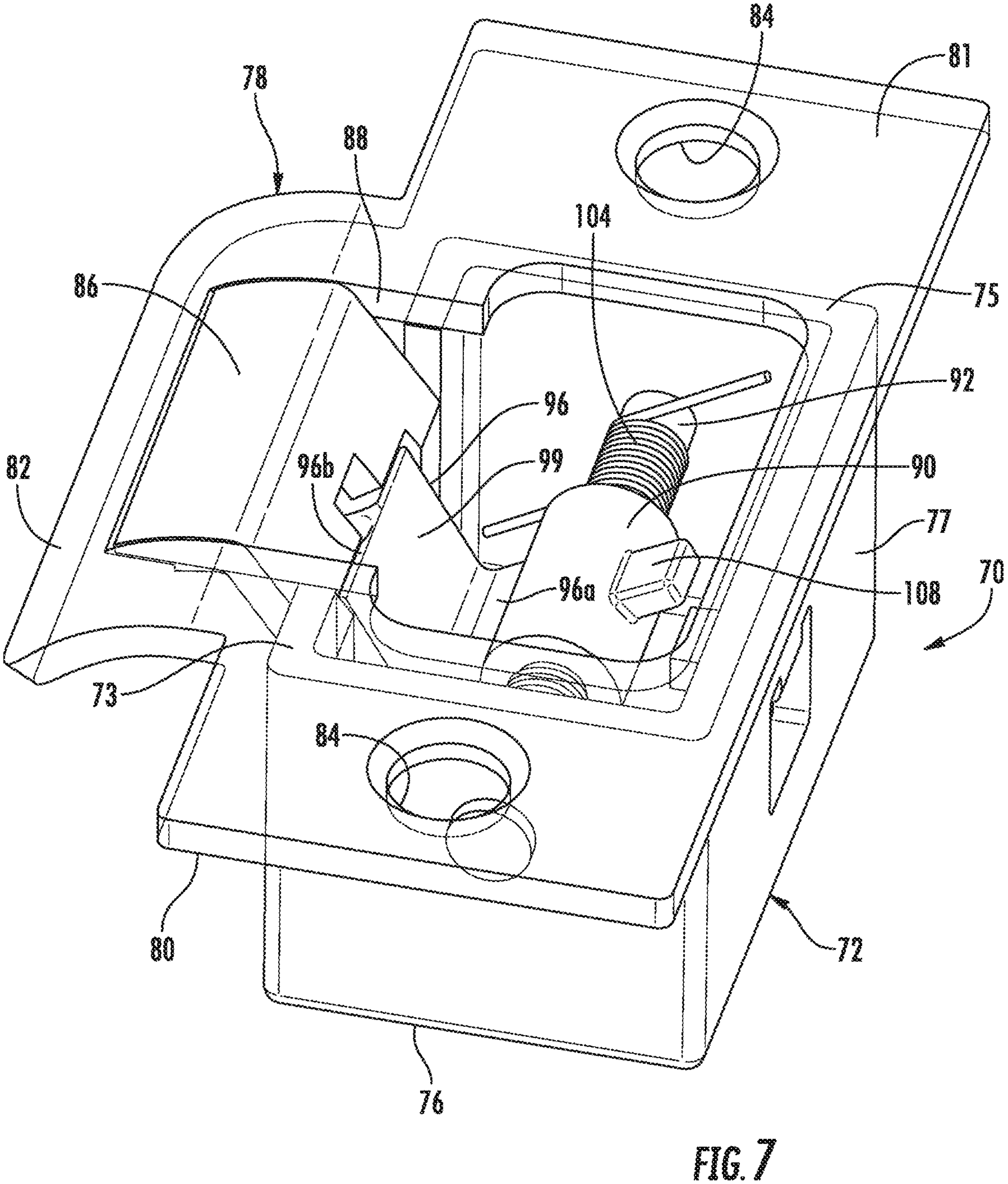
FIG. 7 is a perspective view of the strike assembly of FIG. 4 with the keeper in an unlocked position.

In one embodiment the latch bolt 4 comprises a bolt head 12 mounted on a latch tail 14 such that the bolt head 12 and the latch tail 14 can reciprocate together in the case 3 (e.g., freely moveable, or the like). The latch bolt 4 reciprocates in a first retracting direction as represented by arrow A and in a second extending direction as represented by arrow B (FIG. 5). The bolt head 12 comprises a slot 19 (or other bolt head aperture 19) that receives one end **14*b* of the latch tail 14 and is operatively coupled thereto by any suitable mechanism (e.g., fastener-pin, screw, bolt, or the like, press fit, weld, braze, or any other mechanical or non-mechanical mechanism). The other end of the latch tail 14 includes a flange 14*a* that extends through and reciprocates in an aperture 16 (e.g., a rear wall aperture 16) of the rear wall 18 of the case 3. The bolt head 12 may include a perimeter that partially conforms to the aperture 8 in the front wall 6 of the case 3 and to the aperture 15 in the face plate 11 such that the bolt head 12 is at least partially supported by and can reciprocate relative to the case 3 during extension and retraction of the latch bolt 4**.

The bolt head 12 may comprise a beveled face 20 that faces the strike plate 78 of the strike assembly 70 (otherwise described as a strike box) when the door 7 is moved in a closing direction. The opposite face of the bolt head 12 defines a bolt locking surface 22 and is disposed substantially parallel to the direction of travel of the latch bolt 4.

A spring 28 (or other latch bolt biasing mechanism) is mounted between a mount 32 supported adjacent (e.g., on or near) the bolt head 12 and the rear wall 18 on a post 30 supported on the case 3. The spring 28 comprises a compression spring that biases the latch bolt 4 in the direction of arrow B to the extended position. The post 30 on the case 3 may comprise a post 30 connected to and extending from the rear wall 18 parallel to the direction of travel of the latch bolt 4. The spring 28 may be mounted over the post 30 such that the post 30 holds the spring 28 in position as the spring 28 is compressed and expanded during retraction and extension of the latch bolt 4. The mount 32 (e.g., bolt head mount) on the bolt head 12 may comprise a hollow portion (e.g., aperture), such as a hollow cylinder or tube that supports the opposite end of the spring 28. The mount 32 (e.g., tubular, or the like) may receive the end of the post 30 in its interior when the latch bolt 4 is pushed into case 3. In some embodiments of the invention the spring 28 may be mounted on the latch bolt 4 instead of on the post 30.

Figure 4:
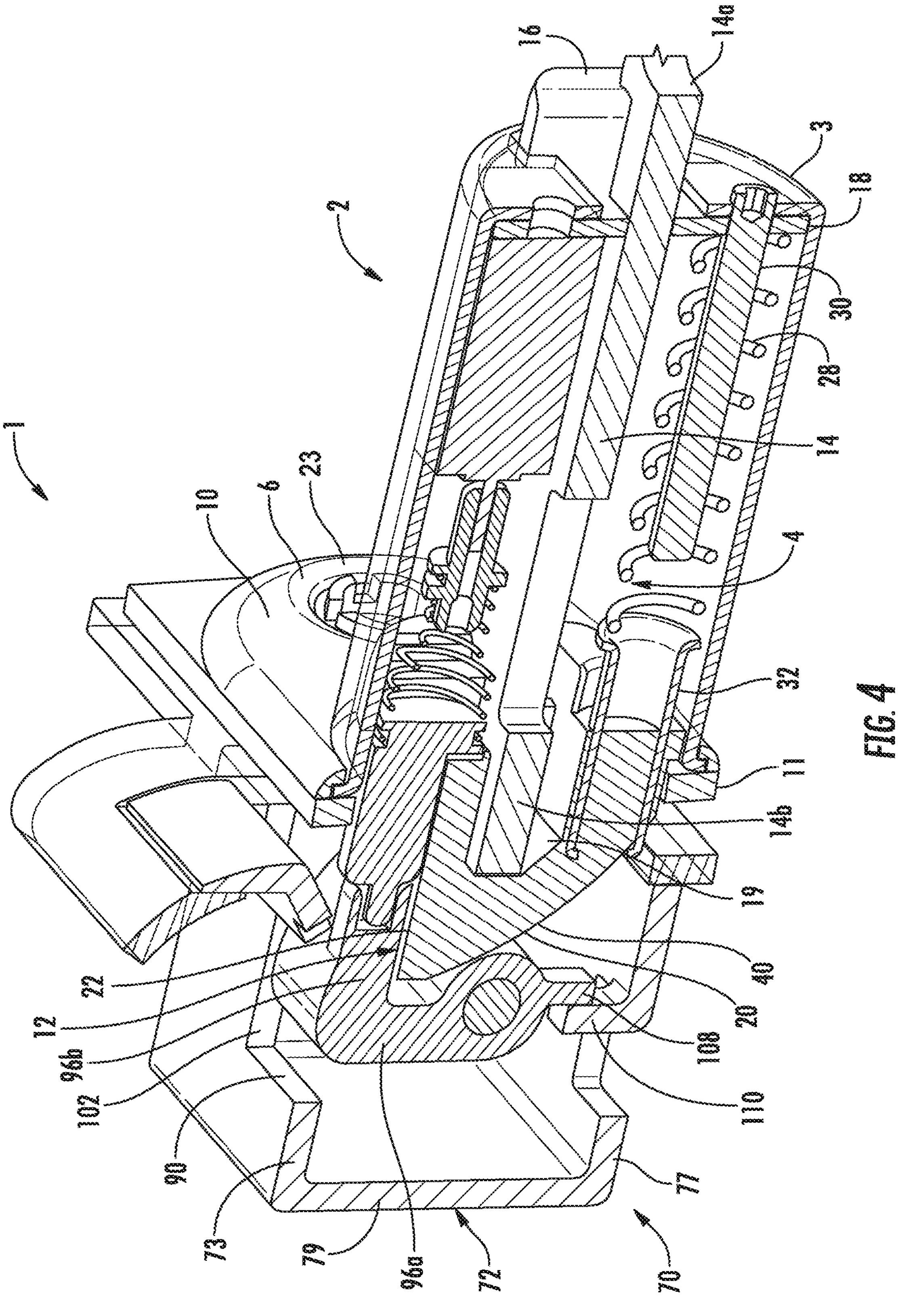
FIG. 4 is a perspective section view of the lock including the lockable push-through latch assembly of FIG. 1 and an embodiment of a strike assembly taken along a longitudinal center-line of the lock.

The lock pin 40 is movable between an extended position (such as a locked position, as illustrated in FIGS. 3-5) where it extends beyond the face plate 11 and can engage a mating keeper 90 in the strike assembly 70 and a retracted position (such as an unlocked position, as illustrated in FIGS. 1 and 2) where it is retracted into the case 3 and is withdrawn from engagement with the keeper 90. The lock pin 40 is mounted for independent reciprocating movement relative to the bolt head 12. The lock pin 40 is positioned adjacent the bolt locking surface 22 (e.g., flat bolt locking surface, or the like) of the bolt head 12 such that it can move between the extended position (e.g., locked position) and the retracted position (e.g., unlocked position) relative to the bolt head 12. As shown in the drawings, the lock pin 40 and the bolt head 12 may comprise surfaces (e.g., flat surfaces) that slide over one another where the lock pin 40 is constrained by the front wall 6 and the face plate 11. In other embodiments, other sliding mechanisms may be provided between the lock pin 40 and the bolt head 12 to allow the lock pin 40 to reciprocate relative to the bolt head 12 but otherwise fix the bolt head 12 and the lock pin 40 in position relative to one another. As such, the bolt head 12 and the lock pin 40 may be slideably moveable with respect to each other directly (e.g., surfaces of each interact directly), or with intervening components (e.g., with one or more surfaces of intervening components).

In one embodiment, the lock pin 40 is extended and retracted by a motor 42. In one embodiment, the motor 42 extends and retracts the lock pin 40 based on a signal received from an electronic access control (EAC) system 50. In some embodiments the motor 42 may be a two-way or reversible motor 42 that operates to both retract and extend the lock pin 40. In other embodiments, the motor 42 may be used only to retract or extend the lock pin 40 while a spring 45 or other biasing mechanism may be used provide the opposite movement. In such an embodiment, the spring 45 may bias the lock pin 40 to one of the extended or retracted positions such that the motor 42 is operated to move the lock pin 40 to the other one of the retracted or extended positions. In the illustrated embodiment, the output shaft 44 of the motor 42 reciprocates linearly to move the lock pin 40 linearly between the retracted and extended positions as represented by arrows C and D (FIG. 5). The output shaft 44 is connected to the lock pin 40 by a spring 45 (or other lock pin biasing mechanism) such that the spring 45 can absorb forces if the lock pin 40 is misaligned with the strike assembly 70 when the lock pin 40 is extended or retracted. Using the spring 45 as a transmission between the output shaft 44 of motor 42 and the lock pin 40 prevents the lock pin 40 from binding in the event that it is misaligned during operation of the latch assembly 2 (or specifically the bolt head 12) and prevents damage to the lock pin 40 and the motor 42. While a linear motor 42 is described for extending and retracting the lock pin 40, the lock pin 40 may be reciprocated between the extended and retracted positions by a rotary motor that is connected to the lock pin 40 by a suitable transmission. The transmission connecting the motor 42 to the lock pin 40 may include a clutch, screw, or other device that prevents binding of the lock pin 40 and protects the components.

Embodiments of the lock 1 may be implemented using an electronic access system (EAS) 50. The EAS can include computer program code which, when executed by a processor, causes the EAS to perform the methods of embodiments of the invention. A computer program product can include a medium with non-transitory computer program code that when executed causes the access system to perform the method according to an embodiment of the invention. The EAS 50 may be used to verify the identity of a person who desires entry to a door secured by lock 1. The EAS 50 may include a control module and/or display and the locking push-through latch 2. The EAS 50 and the locking push-through latch assembly 2 together can also be referred to as the lock 1 (with or without the strike assembly 70) and in fact these assemblies and systems can be sold and installed together, and may even be physically connected.

Figure 10:
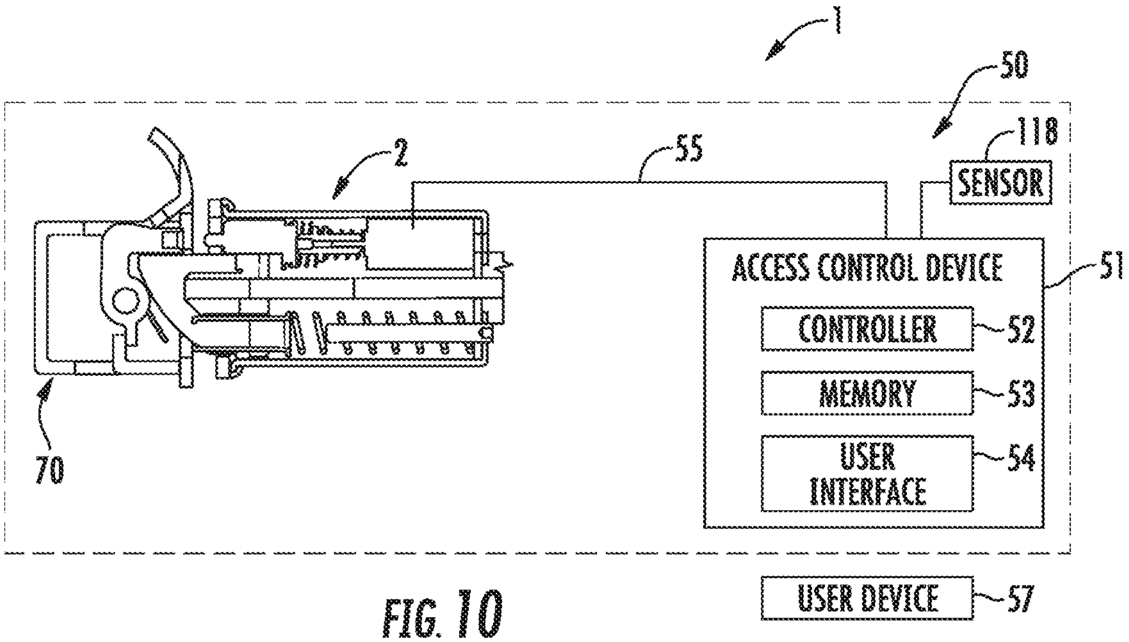
FIG. 10 is an embodiment of a lock including the push-through latch assembly, strike assembly, and access control device according to embodiments of the present invention.

In at least some embodiments of the present invention, the EAS 50 may comprise a standalone system in which an access control device 51 is collocated with the locking push-through latch assembly 2. Referring to FIG. 10, the access control device 51 may be battery powered and may comprise a microprocessor based controller 52 with non-volatile memory 53 where programming is performed at the door 7. The user interface 54 may comprise a keypad with hard or soft buttons that may be used to program the device 51 and to provide access to the system by an authorized user. The user interface 54 may also comprise a reader for interacting with a user access device 57 such as an access card, fob, mobile device or the like. RFID, NFC, or another similar technique can be used to verify the identity of users to allow access to the system. The access control device 51 controls the motor 42 via an interface 55*a* to actuate the motor 42 to retract the locking pin 40 when appropriate credentials are presented to the user interface 54 verifying access. The access control device 51 may provide power to the motor 42 under the control of the controller 52 to control operation of the motor 42. The access control device 51 may also include and/or be operatively coupled to lock operators 63 such as knobs or levers to allow manual actuation of the locking push-through latch 2. The lock operators 63 are operatively coupled to the latch assembly 2 to move the latch bolt 4 between the locked and unlocked positions.

Figure 11:
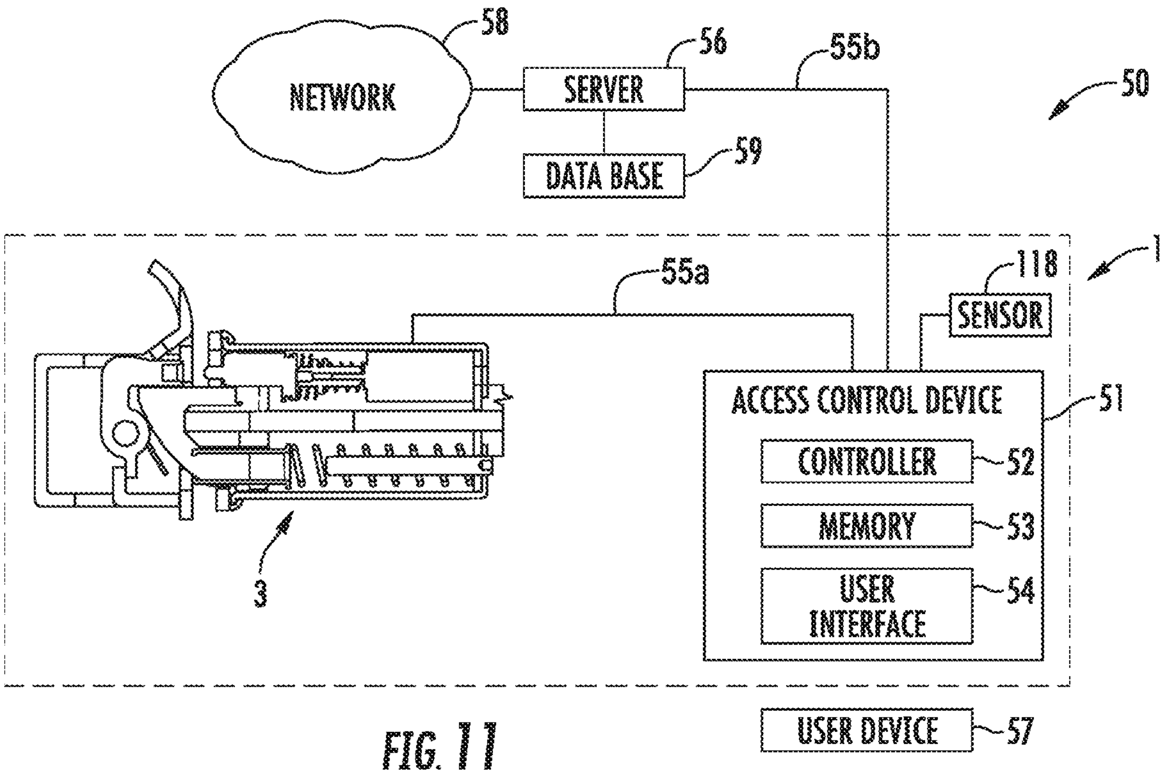
FIG. 11 is an embodiment of a lock including the push-through latch assembly, strike assembly, and access control device according to embodiments of the present invention.
Figure 12:
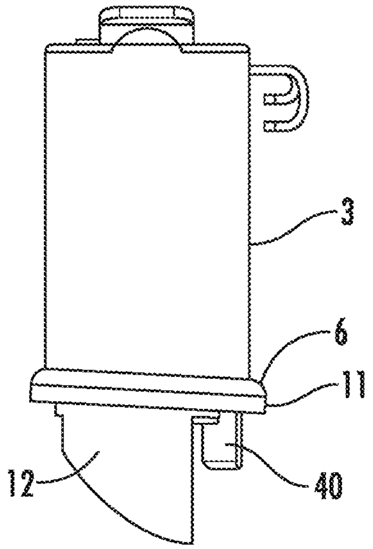
FIG. 12 is a top view of the lockable push-through latch assembly according to embodiments of the present invention.
Figure 13:
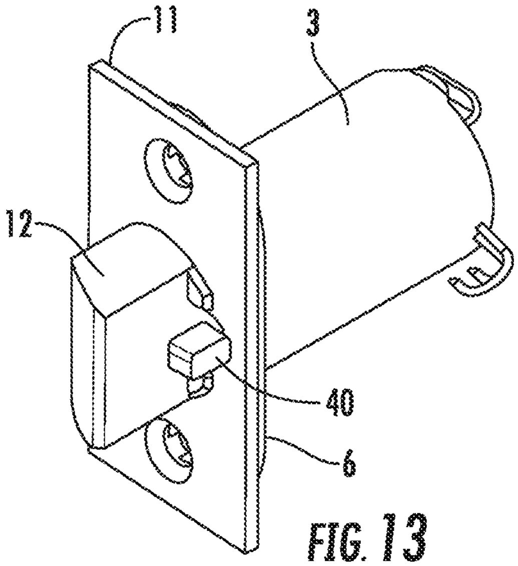
FIG. 13 is a perspective view of the lockable push-through latch assembly of FIG. 12.
Figure 14:
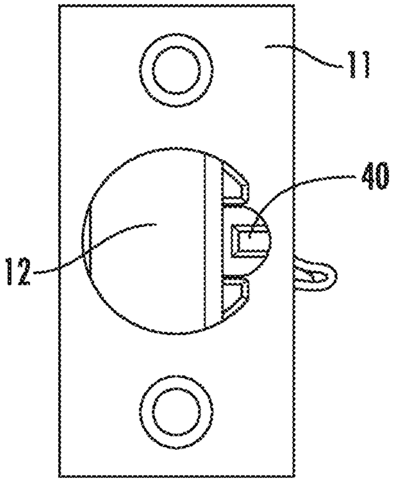
FIG. 14 is a front view of the lockable push-through latch assembly of FIG. 12.
Figure 15:
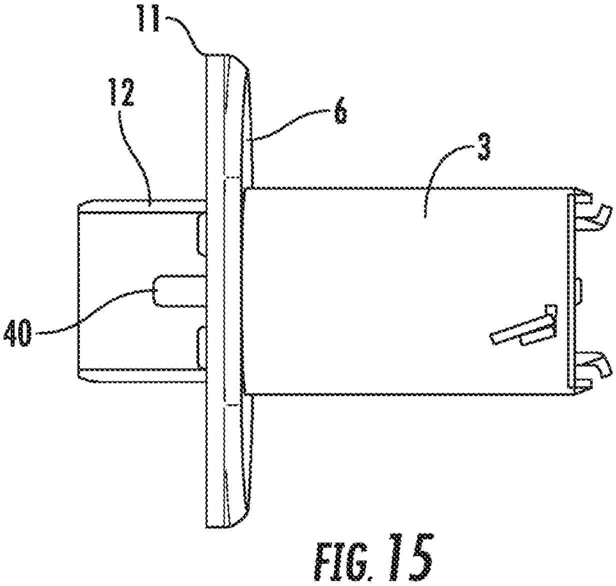
FIG. 15 is a side view of the lockable push-through latch assembly of FIG. 12.
Figure 18:
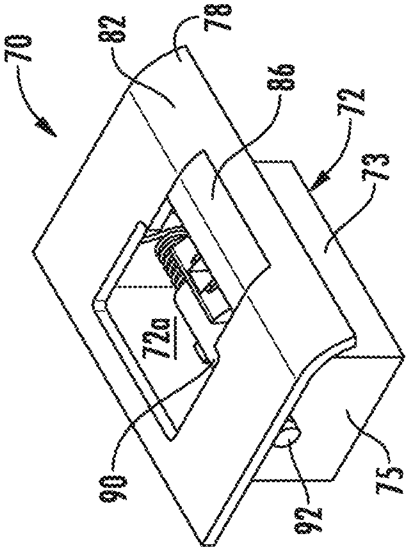
FIG. 18 is another top perspective view of the strike assembly of FIG. 16.
Figure 17:
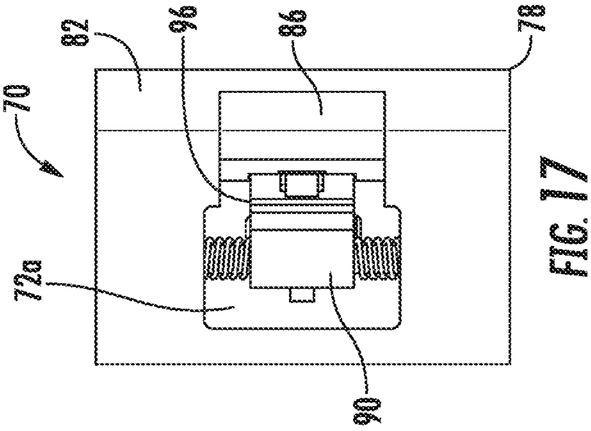
FIG. 17 is a top view of the strike assembly of FIG. 16.
Figure 16:
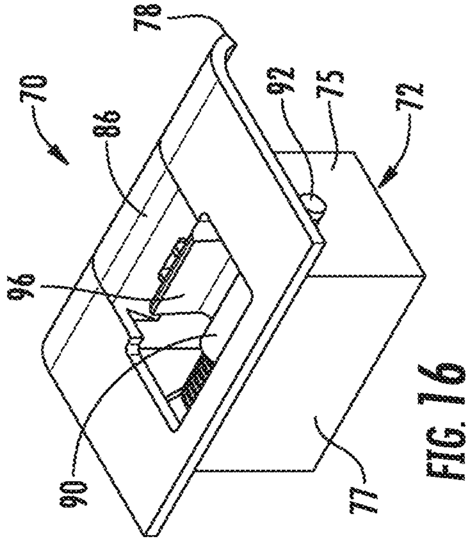
FIG. 16 is a top perspective view of the strike assembly according to embodiments of the present invention.
Figure 19:
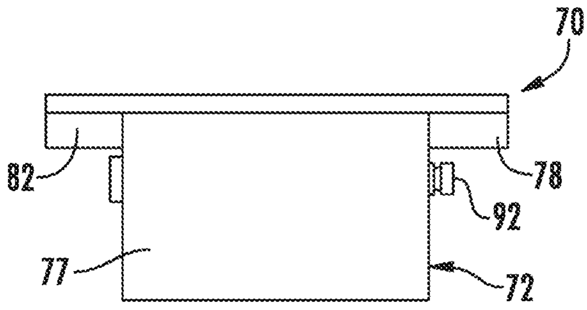
FIG. 19 is a first side view of the strike assembly of FIG. 16.
Figure 20:
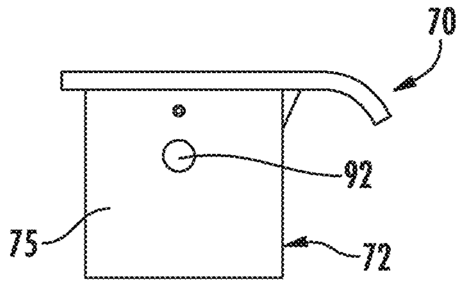
FIG. 20 is a second side view of the strike assembly of FIG. 16.
Figure 21:
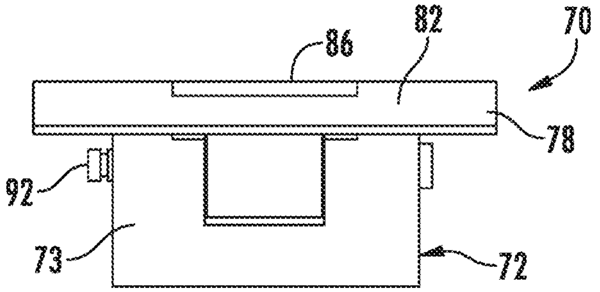
FIG. 21 is a third side view of the strike assembly of FIG. 16.
Figure 24:
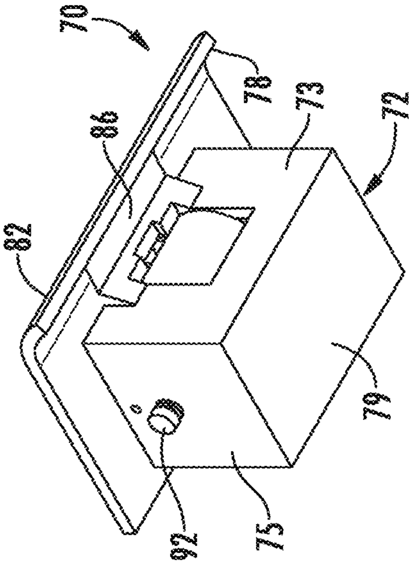
FIG. 24 is another bottom perspective view of the strike assembly of FIG. 16.
Figure 23:
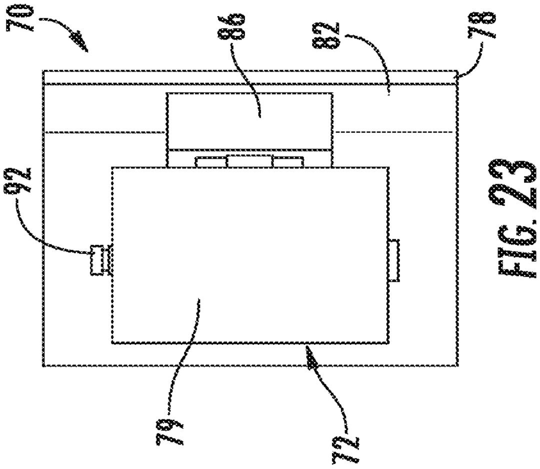
FIG. 23 is a bottom view of the strike assembly of FIG. 16.
Figure 22:
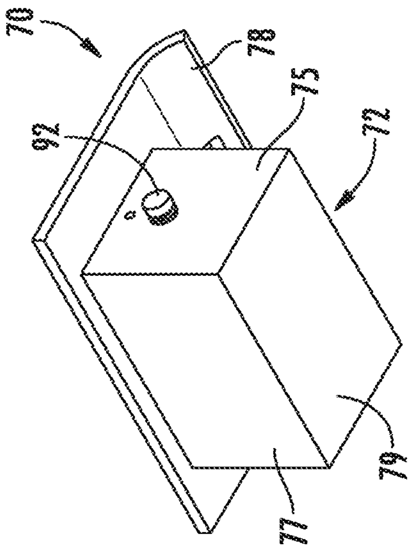
FIG. 22 is a bottom perspective view of the strike assembly of FIG. 16.
Figure 25:
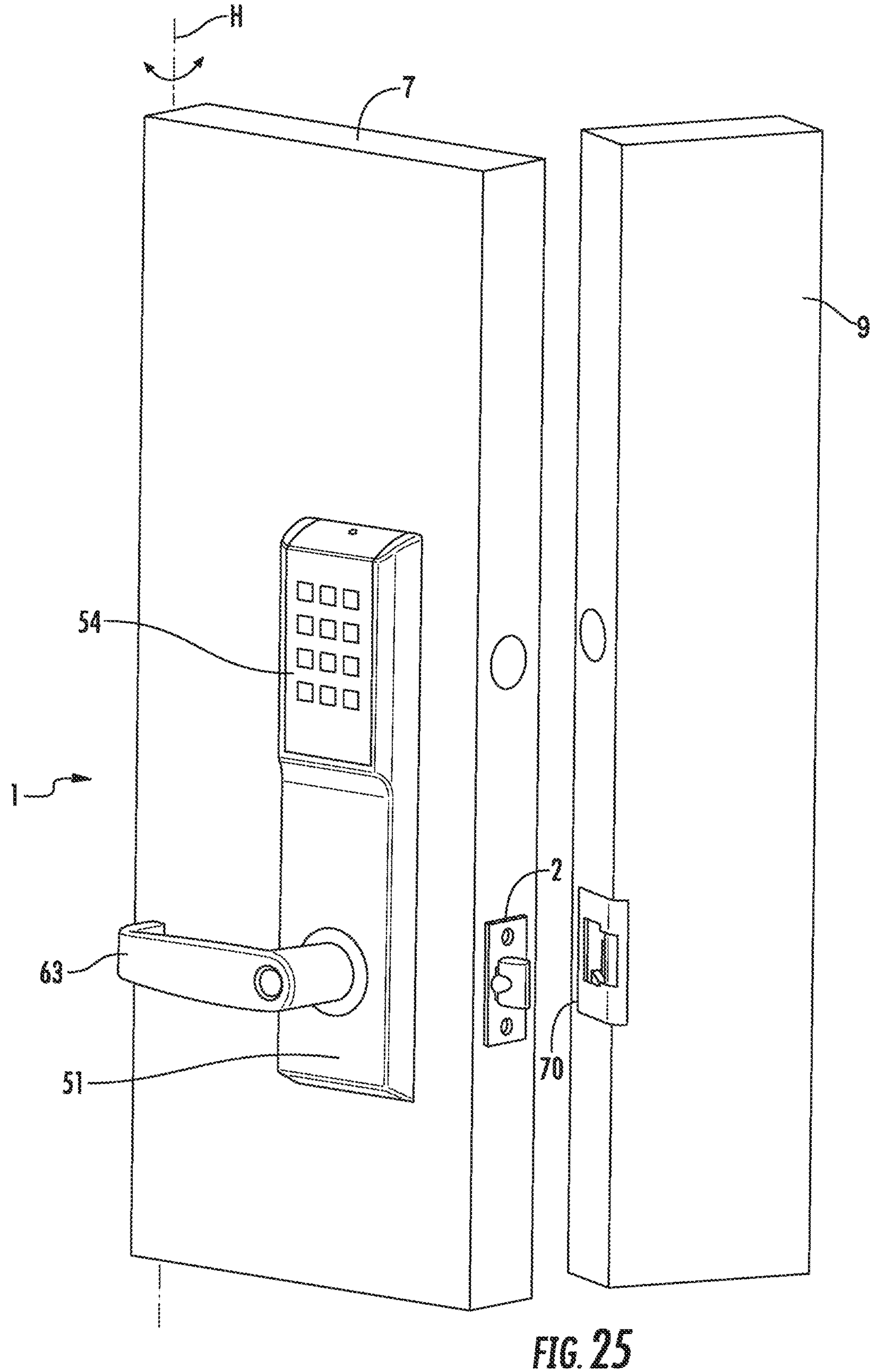
FIG. 25 is a perspective view of the lockable push-through latch assembly mounted in a door and the strike assembly mounted in a frame in accordance with embodiments of the present invention.
Figure 26:
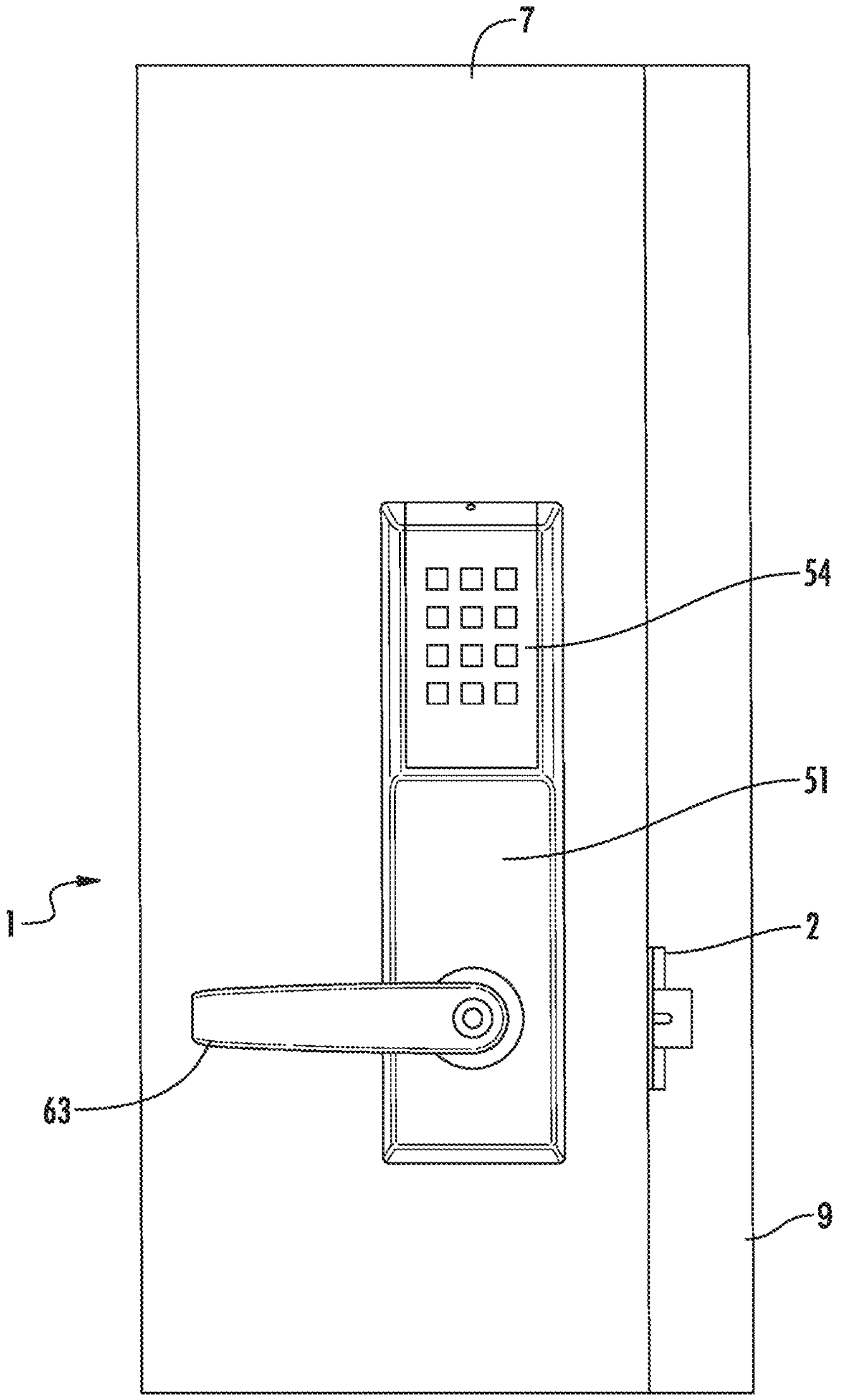
FIG. 26 is a front view of the lockable push-through latch assembly mounted in a door and the strike assembly mounted in a frame in accordance with embodiments of the present invention.
Figure 27:
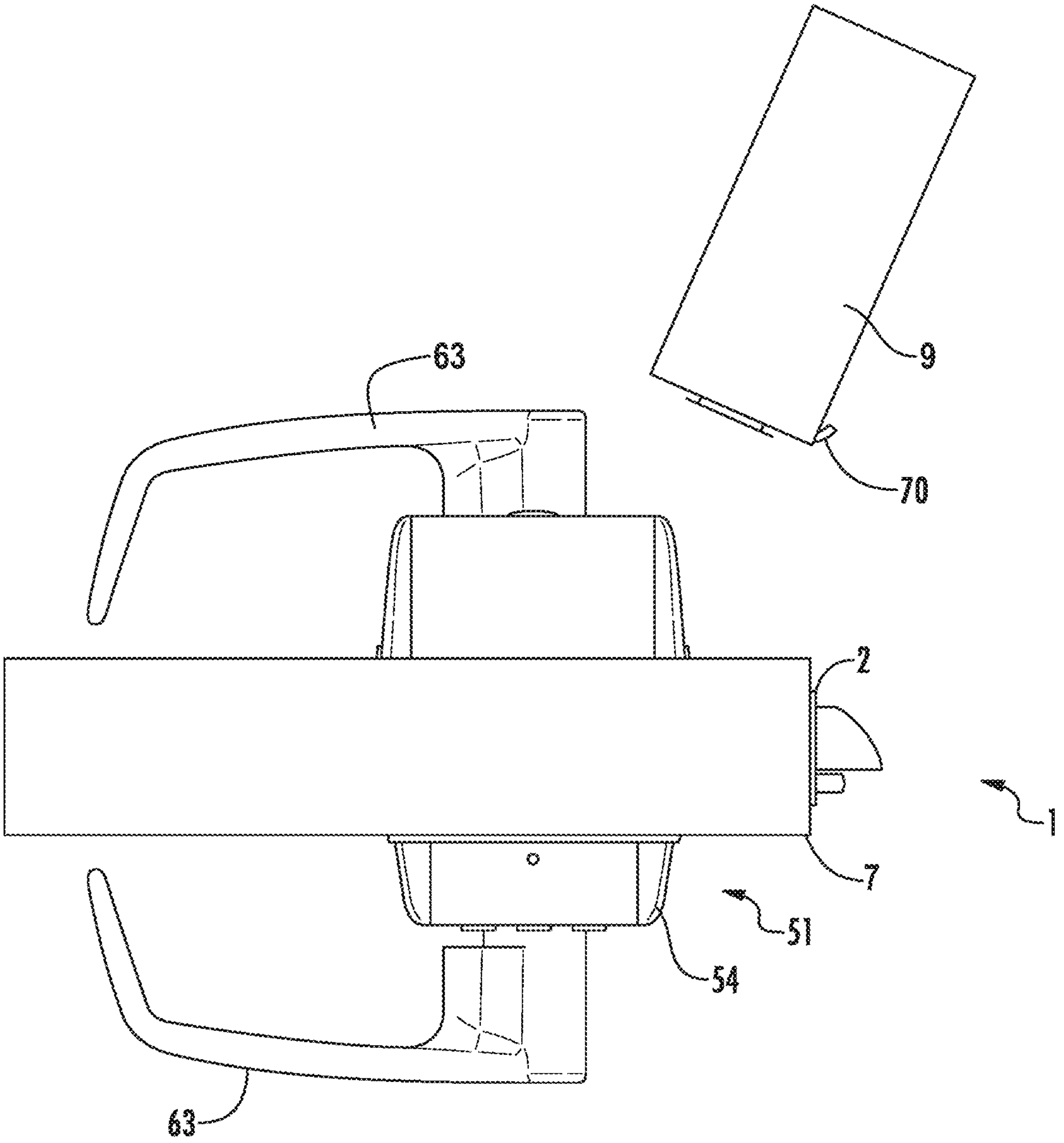
FIG. 27 is a top view of the lockable push-through latch assembly mounted in a door and the strike assembly mounted in a frame in accordance with embodiments of the present invention.
Figure 28:
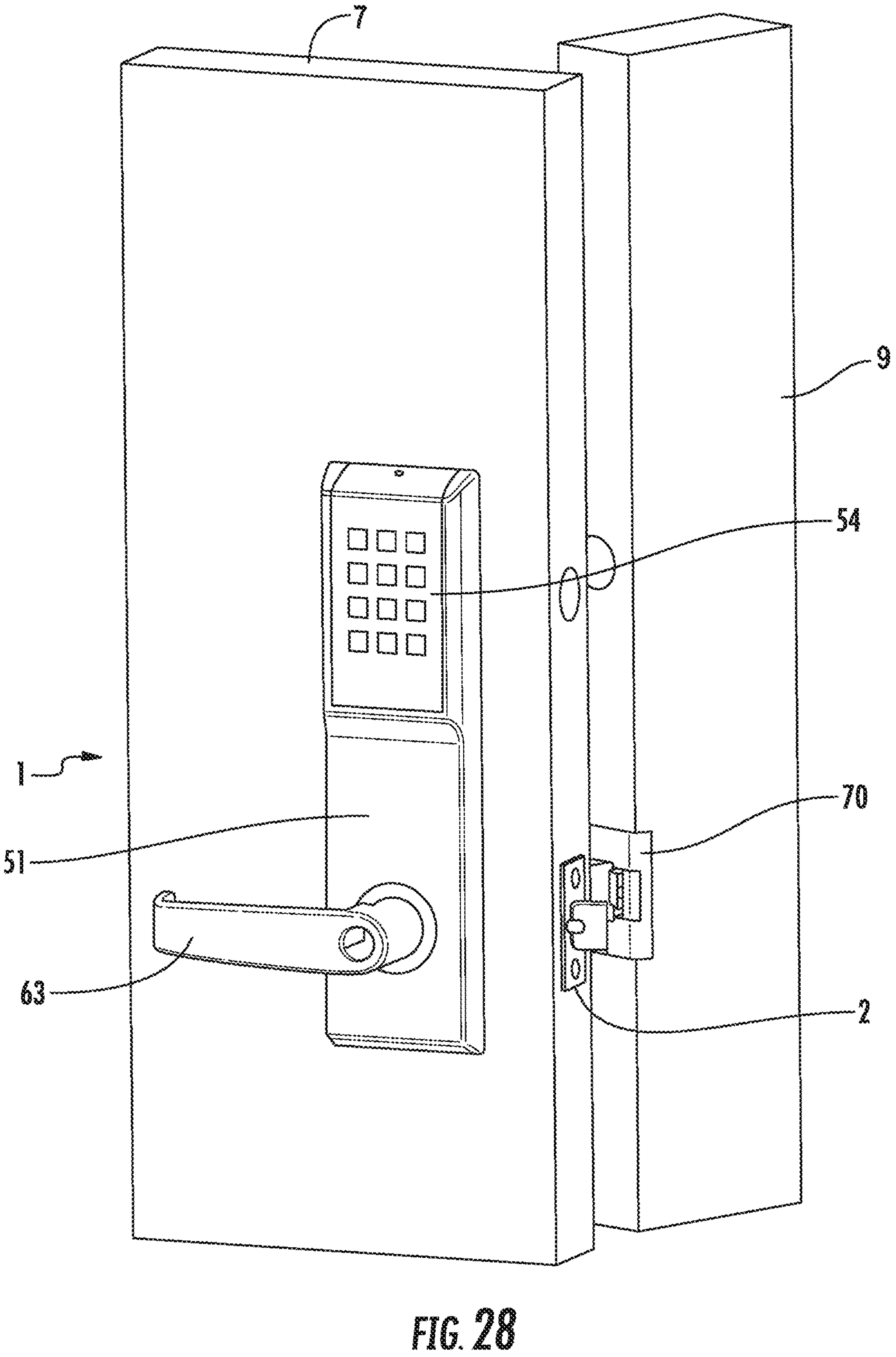
FIG. 28 is a perspective view similar to FIG. 25 of the lockable push-through latch assembly mounted in a door and the strike assembly mounted in a frame in accordance with embodiments of the present invention.

In other embodiments, the EAS 50 may comprise a network 58. Referring to FIG. 11, in such a system the lock 1 can typically communicate with a server 56 in addition to communicating with a user access device 57 placed near the user interface 54 to verify access credentials, such as an access card, fob, mobile device or the like. RFID, NFC, or another similar technique can be used to verify the identity of users to allow access to the system. The lock 1 can be coupled to the server 56 via Wi-Fi, Bluetooth, or some other wireless networking protocol via an interface 55*b*. In other embodiments, the interface 55*b* may comprise a wired interface, such as an Ethernet cable that passes through a hinge of the door. These interfaces 55*a*, 55*b* may include or be implemented by a communication network 58 such as an actual local area network, by a virtual local area network, and/or by a WAN over some great distance. The network may comprise the public communications network and/or the Internet. In the latter case, the Internet might be used, and a secure "pipe" or "tunnel" might be established between the locks 1 or a lock 1 and the server 56. The server 56 may reside on the Internet. Even though the interfaces 55*a*, 55*b* are often bi-directional interfaces, the interfaces may be implemented as unidirectional interfaces that use a unidirectional communication protocol, for example, the Wiegand protocol. The server 56 may access a database 59 in order to access computer readable instructions to implement the invention. The lock controller 52 may communicate with the server 56 in order to control operation of the locking push-through latch 2 (otherwise described as the lock assembly). In some embodiments the various components described herein may be a single physical component or the functionality may be distributed between multiple components (e.g., multiple access control devices 51 and/or the components thereof, sensors 118, user devices 57, networks 58, servers 56, databases 59, interfaces 55*a*, 55*b*, locks 1 and/or components thereof). For example, the server 56, network 58, and/or database 59 may be used to control multiple locks 1.

The lockable push-through latch 2 is used with the strike box 70 (otherwise described herein as the strike assembly 70) as shown in FIGS. 4 through 7. The strike box 70 comprises a box portion 72 (otherwise described herein as a strike housing 72) that may be inserted into a hole or recess formed in a door frame 9 as shown in FIGS. 25-28. Box portion 72 defines an interior space 72*a* (or cavity) configured to receive the bolt head 12 when the push-through latch 2 is in the latched position. The interior space 72*a* may be defined by a top wall 75, bottom wall, 76, front wall 73 and back wall 77 and side wall 79. The side of the box opposite side wall 79 is open to receive the bolt head 12. While the box portion 72 is shown as a five-sided box that is inserted into a hole formed in a door frame 9, the strike box 70 may be formed integrally with the door frame 9 or portions of the strike box 70 may be formed integrally with the door frame 9 and other portions of the strike box 70 may be operatively coupled to the door frame 9. The terms strike box 70 and box portion 72 are intended to include both a separate component as shown and strike boxes that are wholly or partially integrated into the door frame 9. Moreover, the strike box 70 (otherwise described as the strike assembly 70) and the box portion 72 (otherwise described as the strike housing 72), or the like, may be any type of shape or configuration, such as square, rectangular, oval, cylindrical, hexagonal, pentagonal, octagonal, any other polygonal shape, irregular, or other like shape).

The strike box 70 further includes a strike plate 78 extending from front wall 73. The strike plate 78 may be formed in part by a strike plate portion 86 that extends from the front wall 73 of the box portion 72. A face plate 80 may be formed integrally with the box portion 72 or the face plate 80 may be a separate component operatively coupled to the box portion 72. The face plate 80 may include a first strike plate portion 82 that along with the second strike plate portion 86 forms the strike plate 78 that is disposed such that it is contacted by the bevel face 20 of the bolt head 12 when the door is moved to the closed position. In one embodiment the second strike plate portion 86 fits in an aperture 88 (e.g., plate aperture 88) within the first strike plate portion 82 such that the first and second strike plate portions 82, 86 create a substantially uninterrupted strike plate 78. In other embodiments the second strike plate portion 86 may be formed solely as part of the box portion 72 or as part of face plate 80. Moreover, the box portion 72 and face plate 80 may be formed of a single component or of multiple components operatively coupled together to create the strike box 70. The face plate 80 may comprise a flange 81 (e.g., that extends partially or completely around the box portion 72) that is disposed flush with the door frame 9 when the box portion 72 is installed in the door frame 9. A third strike plate portion 112 may be operatively coupled to the second strike plate portion 86 (e.g., and thus form a part of the strike plate 78) and is positioned inboard of the first and second strike plate portions 82, 86. The third strike plate portion 112 may be contacted by the bevel face 20 during opening and/or closing of the door as will hereinafter be described. It should be further understood, that the strike plate may comprise of one or more strike plate portions, including but not limited to the first, second and third strike plate portions 82, 86, 112. The strike box 70 may be operatively coupled to the door frame 9 by fasteners such as screws, or other like fasteners that engage apertures 84 in the flange 81.

A keeper 90 is positioned at least partially within the interior space 72*a* of the strike box 70. The keeper 90 may be moveable within the interior space between multiple positions, including at least a latched position and an unlatched position. The keeper 90 may be moveable through rotation of a shaft, movement of a spring (leaf spring, torsion spring, or the like) or other biasing mechanism, lever, and/or other like mechanism. In one embodiment, the keeper 90 is mounted on a shaft 92 that extends between the top wall 75 and bottom wall 76 and defines the rotational axis R of the keeper 90. In one embodiment, the keeper 90 is fixed to the shaft 92 and the shaft 92 is rotatably supported in the top wall 75 and bottom wall 76 of the box portion 72. Alternatively, the keeper 90 may comprise a bearing sleeve that rotates on the shaft 92 where the shaft 92 is fixed to the strike box 70. The keeper 90 may comprise an arm 96 that extends from the shaft 92 that has a first portion 96*a* that extends generally radially from shaft 92 and a second locking portion 96*b* that extends at approximately a right angle, or other angle (e.g., 20, 30, 40, 50, 60, 70, 80, 90, 110, 120, 130, 140, 150, 160, or the like) from the first portion 96*a*. The end of the second portion 96*b* comprises an aperture 100 for receiving the locking pin 40.

The arm 96 is arranged such that in the latched position (shown in FIGS. 4 and 5), which may otherwise be described herein as the locked position with the lock pin 40, the first portion 96*a* extends approximately perpendicularly to the direction of translation of the latch bolt 4 as represented by arrows A, B and the second portion 96*b* extends substantially parallel to the direction of translation of the latch bolt 4. The keeper 90 and strike box 70 are configured such that when the keeper 90 is in the latched position, the second portion 96*b* is disposed closely adjacent to or in contact with the bolt locking surface 22 (e.g., flat bolt locking surface, or other shaped surface) of the bolt head 12 and is positioned between the third strike plate portion 112 and the bolt head 12. The keeper locking surface 99 (e.g., flat keeper locking surface, or other shaped surface) of the keeper 90 abuts the bolt locking surface 22 of the bolt head 12.

When the locking push-through latch 2 is unlocked, the keeper 90 may be moved (e.g., rotated, retracted, or the like) away from the bolt head 12 such that the keeper 90 does not prevent the unlatching (e.g., retracting) of the latch bolt 4 of push-through latch 2. For example, in the rotating embodiments, in order to allow the keeper 90 to pivot away from the bolt head 12, the front wall 73 of the box portion 72 may include an opening 102 that allows the keeper 90 to swing between the latched and unlatched positions without contacting the wall of the box portion 72. A torsion spring 104 (e.g., keeper spring) is mounted on the shaft 92 to bias the keeper 90 to the locked position. The keeper 90 may also comprise a flange 108 that contacts a stop 110 in the strike box 70 to limit the movement of the keeper 90 under the biasing force of the spring 104 such that the keeper 90 is normally maintained in the locked position, as illustrated in FIGS. 4 and 5. Biasing mechanisms other than the torsion spring 104 may be used to bias the keeper 90 to the latched position.

Figure 8A:
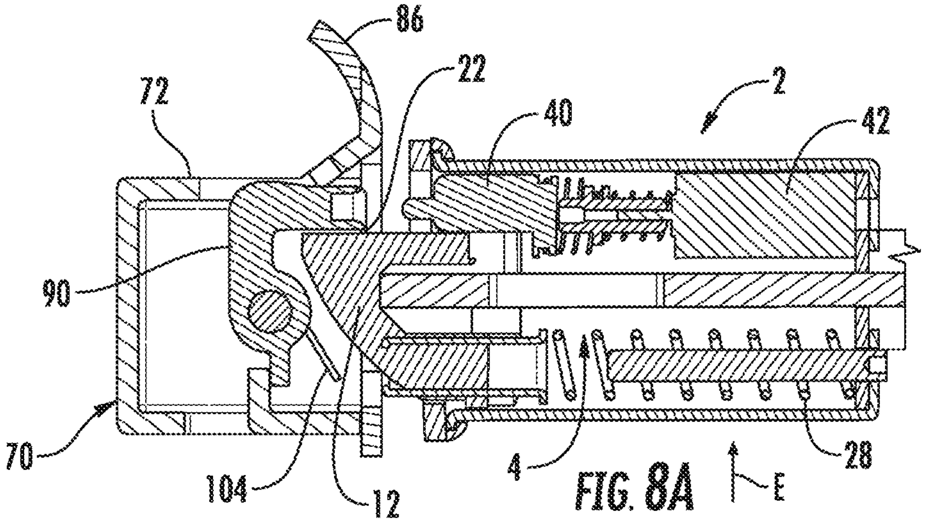
FIGS. 8A through 8E are section views of the lock including the latch assembly and strike assembly illustrating the opening of the latch.
Figure 8B:
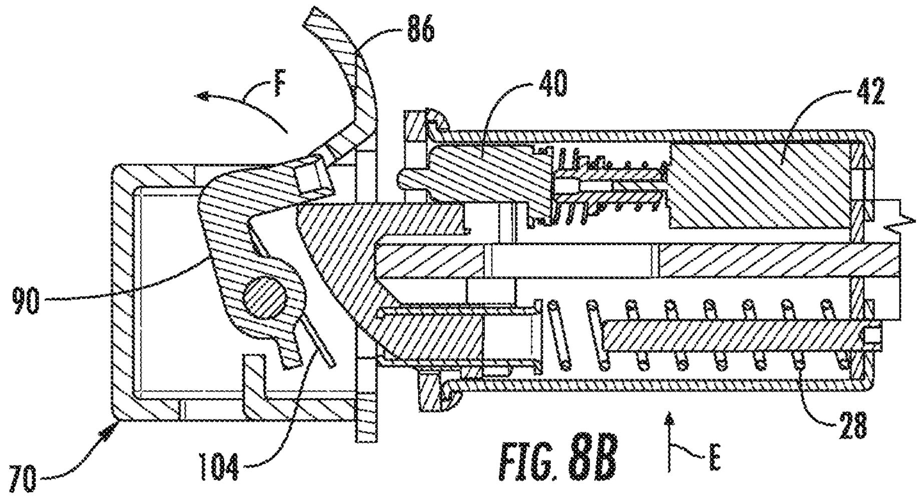
Figure 8C:
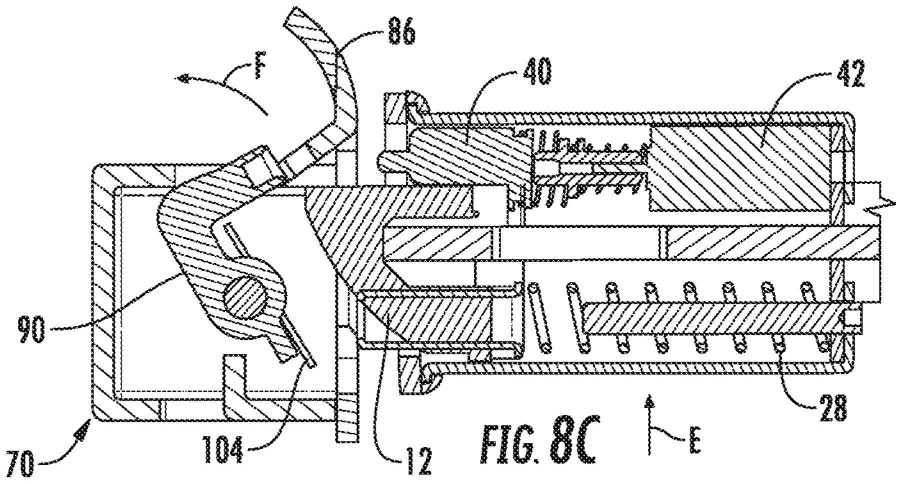
Figure 8D:
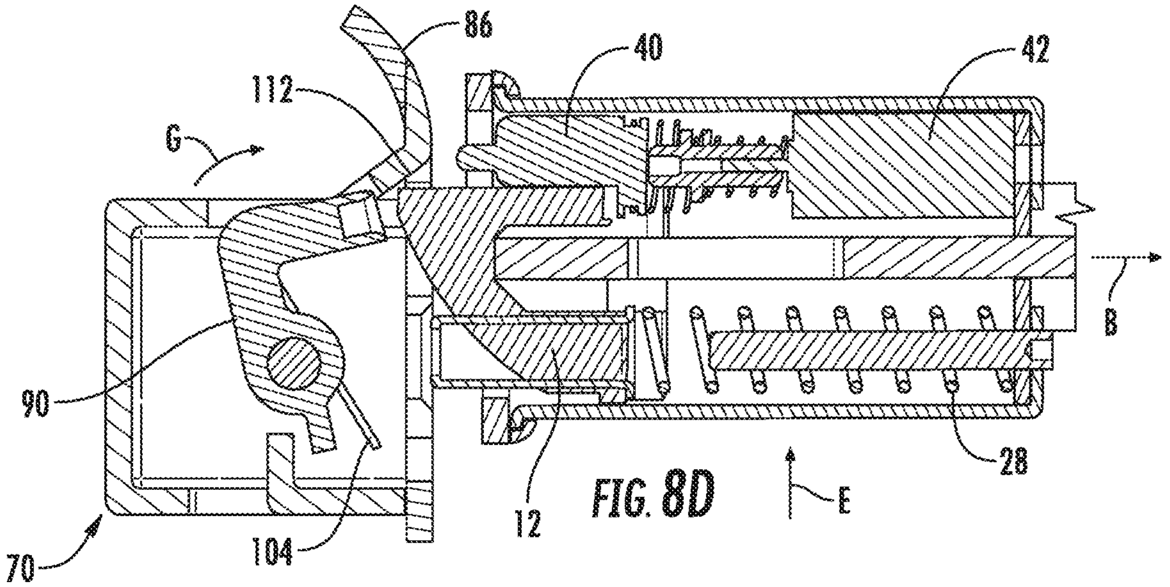
Figure 8E:
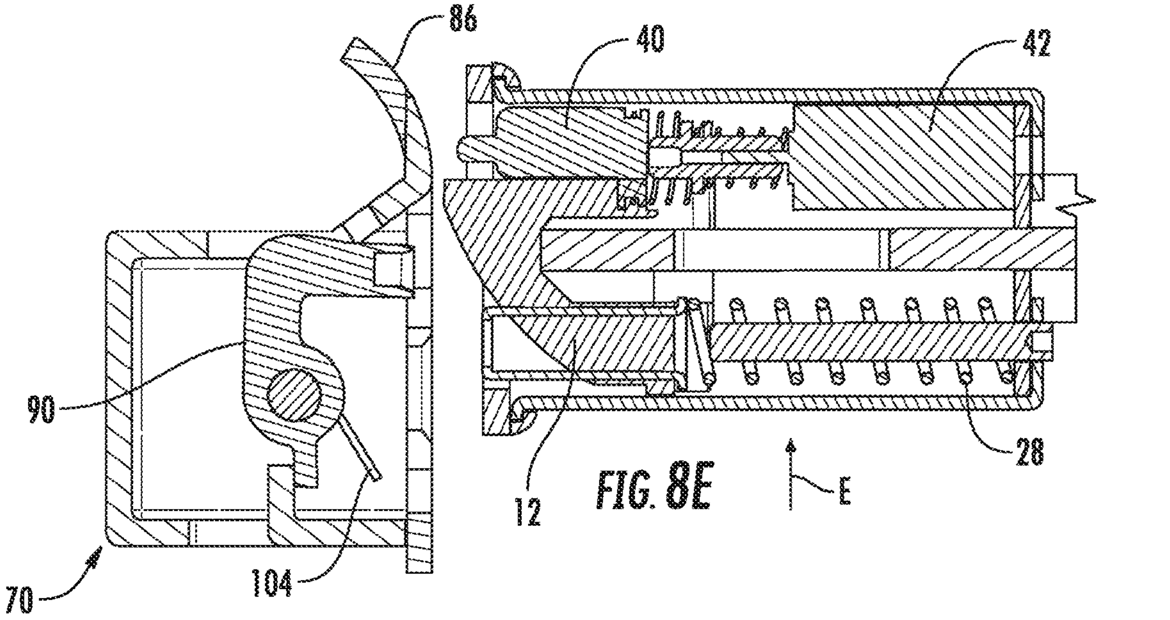

The operation of the latch 2 will now be described in further detail. The opening of the door lock 1 will be described with reference to FIGS. 8A through 8E. FIG. 8A shows the locking push-through latch 2 in the latched (e.g., extended) but unlocked position. In this position the latch bolt 4 is in the extended, latched position with the bolt head 12 extended into the strike box 70 but the locking pin 40 is retracted (e.g., in the unlocked position) and is not engaged with the keeper 90. The keeper 90 is pivoted to the latched position by the spring 104 such that the keeper 90 is engaged with the locking surface 22 of the bolt head 12. The relatively small force exerted by the spring 104 on keeper 90 is sufficient to hold the latch bolt 4 in the latched position in the strike box 70 to thereby maintain the door in the closed position. The latch bolt 4 will remain in the latched position absent any counter force acting on the door. To open the door, the user exerts a force on the door in the direction of arrow E to push the bolt head 12 against the keeper 90. The force may be exerted by pushing one side of the door or by pulling on the opposite side of the door. The force exerted by the bolt head 12 against the keeper 90 is sufficient to move the keeper 90 away from the latched position (e.g., rotate the keeper 90 in the direction of arrow F away from the latched position as shown in FIG. 8B). With the force maintained on the door 7, the door 7 continues to open as the bolt head 12 continues to move the keeper 90 (e.g., rotate the keeper 90 in the direction of arrow F as illustrated in FIGS. 8B and 8C). As the door continues to move (e.g., rotate open in the direction of arrow E), the bolt head 12 passes the keeper 90 and moves into engagement with the strike plate 78 (e.g., a strike plate portion surface, such as the angled surface of the third strike plate portion 112, or the like) of strike box 70 as shown in FIG. 8D. The surface of the third strike plate portion 112 may be angled such that a force is created on the bolt head 12 in the retracting direction. As such, when the bolt head 12 contacts the angled surface of the strike plate 78 (e.g., the third strike plate portion 112), the latch bolt 4 and bolt head 12 are forced to move in the retraction direction, as illustrated by arrow B, against the force exerted by the spring 28, or other biasing mechanism. For example, the spring 28 may be compressed as the bolt head 12 is retracted into the case 3. Once the bolt head 12 moves out of contact with the keeper 90, spring 104 (e.g., keeper spring 104, or other biasing mechanism) rotates the keeper 90 back toward the latched position in the direction of Arrow G, as illustrated in FIG. 8D. The bolt head 12 is maintained in the retracted position until the bolt head 12 clears the strike box 70 and/or the strike plate 78. Once the bolt head 12 clears the strike box 70 the spring 28 returns the bolt head to the extended position.

To lock the push-through latch 2 and prevent opening of the door when the latch bolt 4 is in the extended position (e.g., latched position) of FIG. 8A, the lock pin 40 is extended by the motor 42 in the direction of arrow D such that the lock pin 40 engages the keeper 90 as shown in FIGS. 4 and 5. The motor 42 may be actuated and the lock pin 40 may be extended to the locked position based on manual operation of a control device or automatically. For manual operation a controller 52 may receive an input from a user interface 54 that is operated directly by a user, indirectly using a user control device 57. As previously discussed, the user interface 54 may comprise a reader that recognizes an access card, fob, or mobile device via a reader, RFID, NFC, a key pad, biometric scanner, or the like. The lock pin 40 may also be extended to the locked position automatically, such as by a sensor 118 in communication with the lock controller 52 where the sensor 118 detects that the door is closed and signals the controller 52 to extend the lock pin 40 and lock the door any time the door is in the closed position. As previously described, the lock pin 40 may be moved to one or the other of the locked and unlocked positions by the motor 42 and moved to the other of the locked and unlocked positions by a lock pin spring 45 (or other biasing mechanism), or the motor 42 may move the lock pin 40 to both the locked and unlocked positions.

The sequence of the locking and unlocking of the push-through latch 2 may vary and may be based on the use of the premise on which the lock is installed. For example, in a residential or office environment, a single pulse may be used to energize the motor 42 and maintain the locking pin 40 in the locked position. The locking pin 40 is only retracted when a legitimate credential is presented to the system to unlock the lock 1 and allow access via the door 7. This is a single cycle lock 1 that is returned to the locked state after each cycle such as by a spring 45 or other biasing mechanism, the motor 42, or the like. In a commercial complex the locking pin 40 may be maintained in an unlocked state by the motor 42 (or spring 45, or other biasing mechanism) thereby allowing access through the door 7. After hours the locking pin 40 may be returned to the locked state when the motor 42 is de-energized. Moreover, the lock 1 may have an emergency operation such as a power outage. In such an operation residual energy may be stored in the capacitor of the motor 42 before the power outage and may be released to actuate the motor and move the locking pin 40 to the locked position in the event of a power outage.

When the lock pin 40 is in the extended, locked position the lock pin 40 engages the keeper 90 to prevent the keeper 90 from moving (e.g., rotating in the direction of arrow F) to the unlatched position when a force is applied to the door. As shown in FIGS. 4 and 5, an end 40*a* of the lock pin 40 may be inserted into an aperture 100 (e.g., keeper aperture 100) formed in the facing edge of keeper 90. The lock pin 40 creates a wedge action with the keeper 90 such that when a force E is applied to the door, the keeper 90 is trapped in the latched (otherwise described as the locked position of the lock pin 40) and cannot be rotated to the unlatched position in the direction of arrow F. In this locked position of the lock pin 90, the door cannot be opened until and unless the lock pin 40 is retracted. To retract the lock pin 40, the motor 42 is energized to move the lock pin 40 in the direction of arrow C, as illustrated in FIG. 5. The motor 42 may be energized to retract the lock pin 40 using any suitable control mechanism. The motor 42 may be actuated and the lock pin 40 may be retracted to the unlocked position based on operation of an EAS 50. As previously discussed, a user control device 57 may be used in conjunction with a user interface 54 to verify access credentials and allow the lock pin 40 to be retracted.

Figure 9A:
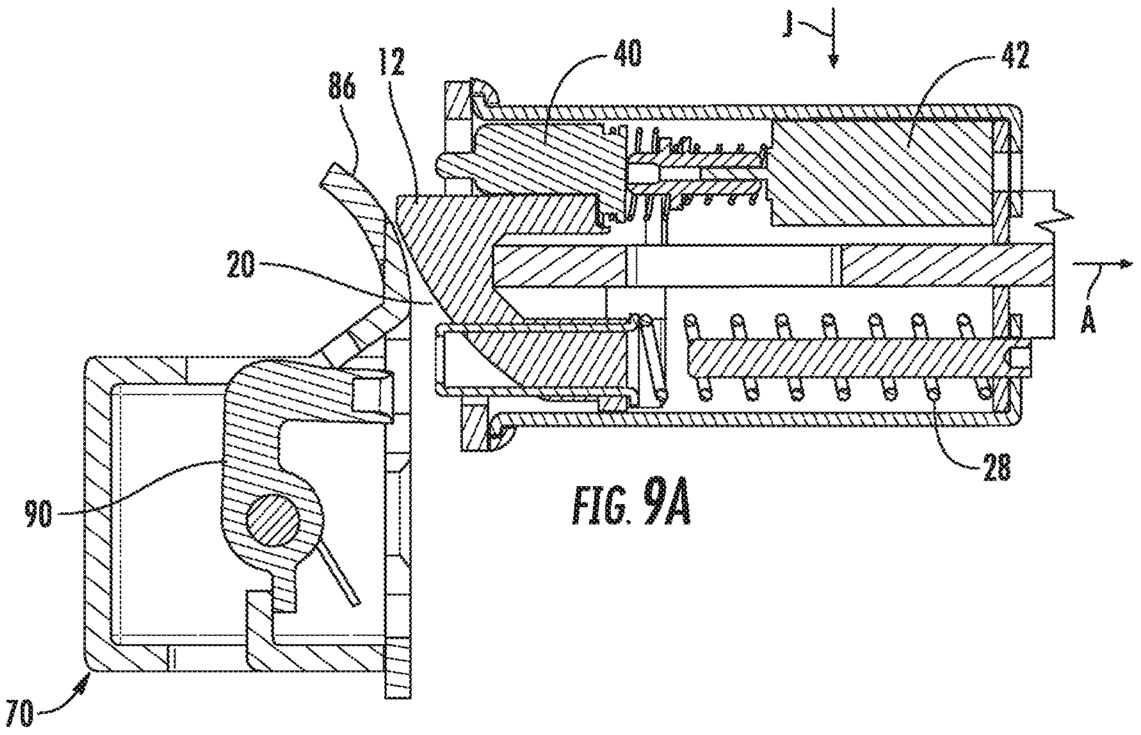
FIGS. 9A through 9D are section views of the lock including the latch assembly and strike assembly illustrating the closing of the latch.
Figure 9B:
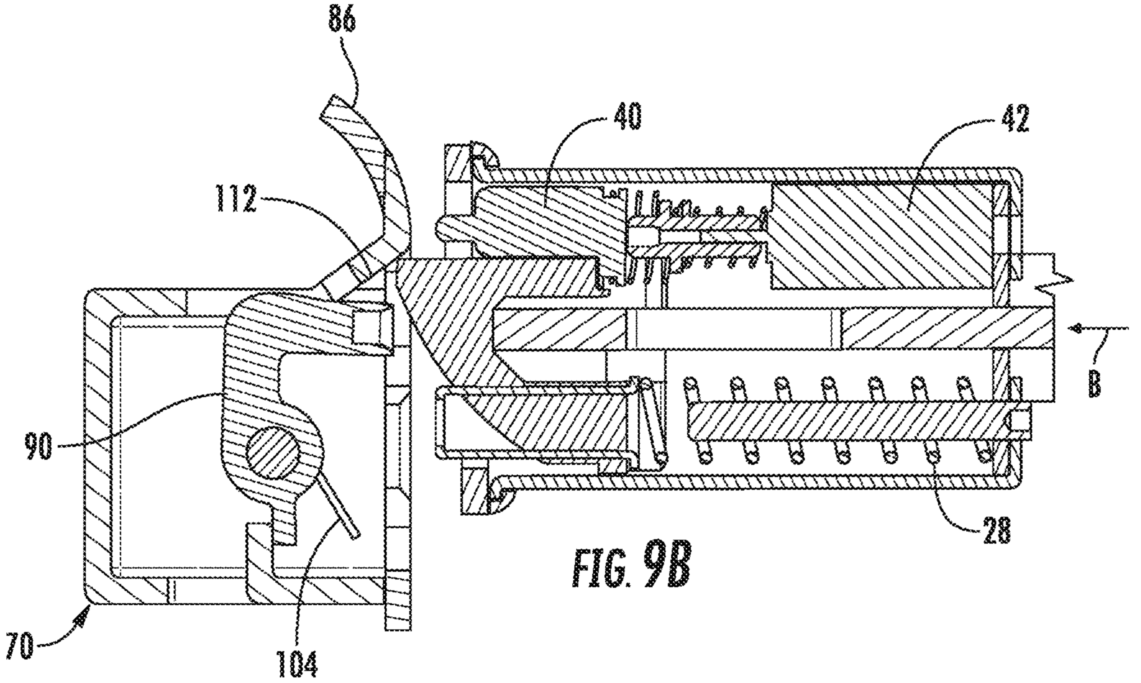
Figure 9C:
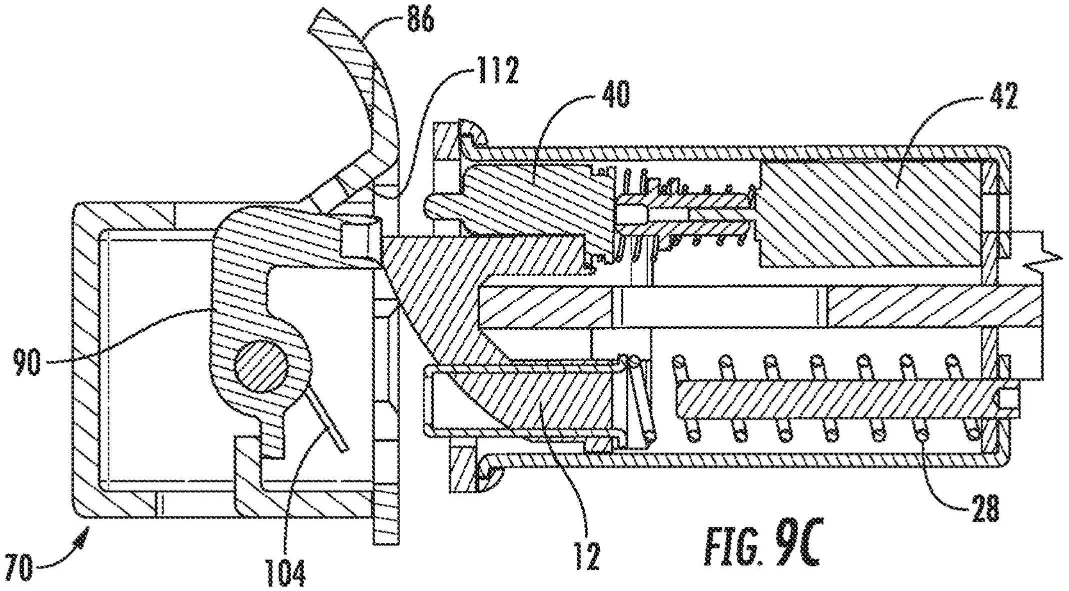
Figure 9D:
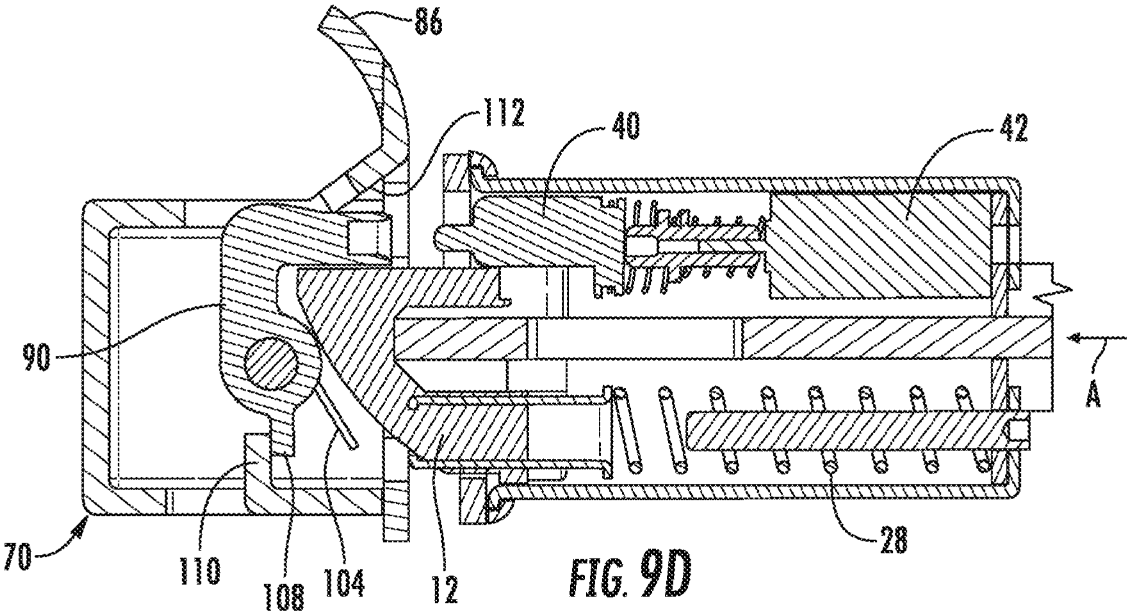

Operation of the lock 1 will be described during closing of the door 7 with reference to FIGS. 9A through 9D. FIG. 9A shows the condition where the door is moving in the closing direction, as represented by arrow J, just as the beveled face 20 of bolt head 12 contacts the strike plate 78 (e.g., first strike plate portion 82 and/or second strike plate portion 86). A force is generated by the strike plate 78 on the bolt head 12 that pushes the bolt head 12 and latch bolt 4 toward the retracted position (in the direction of arrow A). As the latch bolt 4 is pushed in the direction of arrow A, the compression spring 28 (or other biasing mechanism) is compressed and stores energy. Continued movement of the door 7 in the closed position, maintains the latch bolt 4 in the retracted position until the bolt head 12 clears the strike plate 78 or a portion thereof (e.g., the first strike plate portion 82 and/or the second strike plate portion 86). At this point, the bolt head 12 may be extended under the force of spring 28. Specifically, the bolt head 12 rides along the strike plate 78 (e.g., the angled surface of third strike plate portion 112 as it is extended by the spring 28 (or another biasing mechanism) in the direction of arrow B as shown in FIG. 8B. The beveled face 20 of the bolt head 12 engages the distal end of the keeper 90, as the bolt head 12 passes by the keeper 90, FIGS. 9B and 9C. Typically, the force exerted by spring 104 (or other keeper biasing mechanism) on keeper 90 is greater than the force exerted by spring 28 (or post or latch bolt spring, or the like) on the latch bolt 4 such that the keeper 90 maintains the latch bolt 4 in the retracted position and allows the bolt head 12 to move past the keeper 90, or a portion thereof. In other embodiments, the force exerted by the spring 104 on the keeper 90 is less than the force exerted by the spring 28 on the latch bolt 4 such that the keeper 90 may be pivoted away from the bolt head 12 to allow the bolt head 12 to move past the keeper 90, or a portion thereof. Once the bolt head 12 passes the keeper 90 the bolt head 12 is extended into the box portion 72 under the force of spring 28 and the keeper 90 is either already in the latched position or is moved (e.g., rotated, or the like) to the latched position by spring 104 (or other biasing member), as illustrated in FIG. 9D. In this position, the door 7 is held closed by the push-through latch 2, but may be opened by a force exerted on the door in the direction of arrow E as previously described with respect to FIGS. 8A-8E (e.g., without having to engage a lock operator 63, such as a handle or knob). The lock pin 40 may be extended to the locked position such that the lock pin 40 engages the keeper 90, as previously described, to lock the latch bolt 4 in position and to prevent opening of the door 7.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A lock, comprising:

a latch assembly comprising:

a latch assembly housing;

a bolt head movable relative to the latch assembly housing between an extended position and a retracted position;

a lock pin movable in a direction parallel to a direction of movement of the bolt head between a locked position and an unlocked position; and a motor operatively coupled to the lock pin and configured to move the lock pin between the locked position and/or the unlocked position; and a strike assembly comprising:

a strike housing for receiving the bolt head; and a keeper movable between a latched position and an unlatched position relative to the bolt head;

wherein when the lock pin is in the locked position, the lock pin engages the keeper while the keeper is in the latched position to hold the keeper in the latched position; and wherein the keeper is configured to receive the bolt head while the keeper is in the latched position.

2. The lock of claim 1, wherein the latch assembly further comprises:

a keeper biasing mechanism, wherein the keeper biasing mechanism biases the keeper to the latched position.

3. The lock of claim 1, wherein the latch assembly further comprises:

a bolt head biasing mechanism, wherein the bolt head biasing mechanism biases the bolt head to the extended position.

4. The lock of claim 1, wherein the latch assembly further comprises:

a mount operatively coupled to the bolt head; and a post;

wherein the post engages the mount to set the retracted position.

5. The lock of claim 1, wherein when the bolt head moves it exerts a force against the keeper to rotate the keeper from the latched position towards the unlatched position.

6. The lock of claim 1, further comprising:

an access control device operatively coupled to the motor, wherein the motor is actuated in response to receiving a signal from the access control device.

7. The lock of claim 6, wherein the motor is actuated in response to receiving the signal from a user interface in the access control device and/or a user access device, wherein the access control device comprises the user interface and wherein the user access device is separate from the lock.

8. The lock of claim 1, wherein the motor is actuated in response to receiving a signal from a sensor operatively coupled to the motor.

9. The lock of claim 1, wherein the strike assembly further comprises:

a stop operatively coupled to the strike housing, and wherein the stop engages the keeper to set the latched position.

10. The lock of claim 1, wherein the strike assembly further comprises a strike plate operatively coupled to the strike housing, and wherein when the keeper is in the unlatched position a keeper locking surface and a strike plate surface of a strike plate portion are planar, and wherein the bolt head slides along the keeper locking surface and the strike plate surface.

11. The lock of claim 1, wherein the lock pin is abutting the bolt head.

12. The lock of claim 1, wherein the bolt head is configured to move the keeper from the latched position to the unlatched position.

13. The lock of claim 1, wherein the lock pin and the bolt head are at least partially disposed in the latch assembly housing.

14. The lock of claim 1, wherein the latch assembly is disposed in a door.

15. The lock of claim 1, wherein the bolt head moves linearly relative to the latch assembly housing between the extended position and the retracted position.

16. A strike assembly, comprising:

a strike housing, wherein the strike housing is configured to receive a bolt head of a lock;

a keeper operatively coupled to the strike housing, wherein the keeper is movable relative to the strike housing between a latched position and an unlatched position, wherein the keeper is configured to receive a lock pin of a latch assembly while the keeper is in the latched position, and wherein the lock pin is configured to maintain the keeper in the latched position when the keeper receives the lock pin;

a keeper biasing mechanism, wherein the keeper biasing mechanism biases the keeper to the latched position; and a strike plate operatively coupled to the strike housing and including an angled surface, wherein the angled surface is configured to retract the bolt head of the lock when the keeper is in the unlatched position and the bolt head is moved against the angled surface.

17. The strike assembly of claim 16, further comprising:

a stop operatively coupled to the strike housing, and wherein the stop engages the keeper to set the latched position.

18. The strike assembly of claim 16, wherein the keeper is configured to be moved by the bolt head from the latched position to the unlatched position.

19. The strike assembly of claim 16, wherein the strike assembly is disposed in a door frame, and wherein the latch assembly is disposed in a door.

20. A method of operating a lock, the lock comprising a latch assembly comprising a latch assembly housing, a bolt head, a lock pin, and a motor, and a strike assembly comprising a strike housing and a keeper, the latch assembly being mounted to a door, and the strike assembly mounted to a frame adjacent the door, the method comprising:

moving the bolt head relative to the latch assembly housing to an extended position into the strike housing;

moving the keeper into a latched position; and actuating the motor to move the lock pin in a direction parallel to a direction of movement of the bolt head from an unlocked position to a locked position, wherein in the locked position the lock pin engages the keeper while the keeper is in the latched position to maintain the keeper to restrict movement of the bolt head, and wherein the keeper is configured to receive the bolt head while the keeper is in the latched position.

21. The method of claim 20, further comprising:

moving the lock pin from the locked position to the unlocked position such that the lock pin is disengaged from the keeper; and moving the door to move the bolt head to exert a force on the keeper such that the keeper moves to an unlatched position.

22. The method of claim 20, wherein the lock further comprises an access control device operatively coupled to the motor, and the method further comprises:

actuating the motor in response to receiving a signal from the access control device.

23. The method of claim 20, wherein the lock pin is moved from the unlocked position to the locked position in response to closing of the door.

24. The method of claim 20, wherein the lock pin is abutting the bolt head.

25. The method of claim 20, further comprising moving the keeper from the latched position to an unlatched position with the bolt head.

26. The method of claim 20, wherein the lock pin and the bolt head are at least partially disposed in the latch assembly housing.

* * * * *